US011919580B2

(12) United States Patent
Yang et al.

(10) Patent No.: US 11,919,580 B2
(45) Date of Patent: Mar. 5, 2024

(54) METHODS AND APPARATUS TO MOVE A STEERING WHEEL

(71) Applicant: Ford Global Technologies, LLC, Dearborn, MI (US)

(72) Inventors: Zhongzhou Yang, Novi, MI (US); Alex Parker, Novi, MI (US); Zheng Tan, Livonia, MI (US); Bo Lin, Ypsilanti, MI (US); Justin Sekula, Berkley, MI (US); William Bouse, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 159 days.

(21) Appl. No.: 17/546,703

(22) Filed: Dec. 9, 2021

(65) Prior Publication Data

US 2023/0182807 A1 Jun. 15, 2023

(51) Int. Cl.
*B62D 6/00* (2006.01)
*B62D 5/00* (2006.01)
*B62D 5/04* (2006.01)
*B62D 6/02* (2006.01)

(52) U.S. Cl.
CPC ........... *B62D 5/0466* (2013.01); *B62D 5/003* (2013.01); *B62D 5/0463* (2013.01)

(58) Field of Classification Search
CPC .............................. B62D 5/0466; B62D 6/002
See application file for complete search history.

(56) References Cited

U.S. PATENT DOCUMENTS

| 9,434,415 | B2 | 9/2016 | Lavoie | |
|---|---|---|---|---|
| 10,676,121 | B2 | 6/2020 | Lubischer et al. | |
| 2006/0006020 | A1* | 1/2006 | Ono | B62D 5/0472 180/446 |
| 2007/0233345 | A1* | 10/2007 | Endo | B62D 5/049 701/41 |
| 2008/0119986 | A1* | 5/2008 | Wei | B62D 15/0245 701/41 |

(Continued)

FOREIGN PATENT DOCUMENTS

| DE | 102009000244 | 7/2010 |
|---|---|---|
| JP | 2019188992 | 10/2019 |

*Primary Examiner* — Long T Tran
(74) *Attorney, Agent, or Firm* — Lorne Forsythe; Hanley, Flight & Zimmerman, LLC

(57) ABSTRACT

Methods, apparatus, systems and articles of manufacture are disclosed. An example vehicle disclosed herein includes a steering assist system, a steering wheel, and a steering controller to detect a request to move the steering wheel of the vehicle to a first rotational position, the steering wheel having a second rotational position, actuate, via the steering assist system, the steering wheel towards the first rotational position, determine, based on a relationship between a first parameter and a second parameter, a third rotational position, the third rotational position having an angular offset from the first rotational position, the first parameter corresponding to a position of the steering system, the second parameter corresponding to a load on the steering system, and in response to reaching the third rotational position, disengage the steering assist system, the disengagement causing the steering wheel to rotate to the first rotational position.

20 Claims, 10 Drawing Sheets

(56) References Cited

U.S. PATENT DOCUMENTS

| | | | |
|---|---|---|---|
| 2009/0024280 A1* | 1/2009 | Kato | B62D 5/008 |
| | | | 701/41 |
| 2014/0238768 A1* | 8/2014 | Tamaizumi | B62D 5/0463 |
| | | | 180/446 |
| 2016/0167701 A1* | 6/2016 | Sone | B62D 5/0463 |
| | | | 701/43 |
| 2016/0244070 A1* | 8/2016 | Bendewald | B62D 1/181 |
| 2018/0086341 A1* | 3/2018 | Taniguchi | B62D 6/008 |
| 2020/0361530 A1 | 11/2020 | Polmans et al. | |

* cited by examiner

US 11,919,580 B2

METHODS AND APPARATUS TO MOVE A STEERING WHEEL

FIELD OF THE DISCLOSURE

This disclosure relates generally to vehicles, and more particularly, to methods and apparatus to move a steering wheel.

BACKGROUND

A steering wheel is configured to change a driving direction of a vehicle based on a rotation of the steering wheel. For example, a driver rotating the wheel in a given direction causes a system of pivoted joints to interact, thereby transferring the rotational motion of the steering wheel into a pivoting motion of one or more road wheels. Known steering systems include rack and pinion systems as well as steering box systems. Rack and pinion systems rely on a gear wheel (e.g., a pinion) at the base of the steering column that causes a rack to translate from side to side, propagating the motion to the road wheels. Steering box systems include worm gears, which can be used to move a drop arm linked by a track rod to a steering arm, resulting in the movement of the front wheels. Modern vehicle steering wheels can be configured to retract toward the dashboard to allow additional cabin space.

SUMMARY

An example vehicle disclosed herein includes a steering assist system, a steering wheel, and a steering controller to detect a request to move the steering wheel of the vehicle to a first rotational position, the steering wheel having a second rotational position, actuate, via the steering assist system, the steering wheel towards the first rotational position, determine, based on a relationship between a first parameter and a second parameter, a third rotational position, the third rotational position having an angular offset from the first rotational position, the first parameter corresponding to a position of the steering system, the second parameter corresponding to a load on the steering system, and in response to reaching the third rotational position, disengage the steering assist system, the disengagement causing the steering wheel to rotate to the first rotational position.

An example method disclosed herein includes detecting a request to move a steering wheel of a steering system of a vehicle to a first rotational position, the steering wheel having a second rotational position, actuating, via a steering assist system, the steering wheel towards the first rotational position, determining, based on a relationship between a first parameter and a second parameter, a third rotational position, the third rotational position having an angular offset from the first rotational position, the first parameter corresponding to a position of the steering system, the second parameter corresponding to a load on the steering system, and in response to reaching third rotational position, disengaging the steering assist system, the disengagement causing the steering wheel to rotate to the first rotational position An example non-transitory computer readable medium disclosed herein includes instructions which, when executed, cause a processor to at least detect a request to move a steering wheel of a steering system of a vehicle to a first rotational position, the steering wheel having a second rotational position, actuate, via a steering assist system, the steering wheel towards the first rotational position, determine, based on a relationship between a first parameter and a second parameter, a third rotational position, the third rotational position having an angular offset from the first rotational position, the first parameter corresponding to a position of the steering system, the second parameter corresponding to a load on the steering system, and in response to reaching third rotational position, disengage the steering assist system, the disengagement causing the steering wheel to rotate to the first rotational position.

Figure 1:
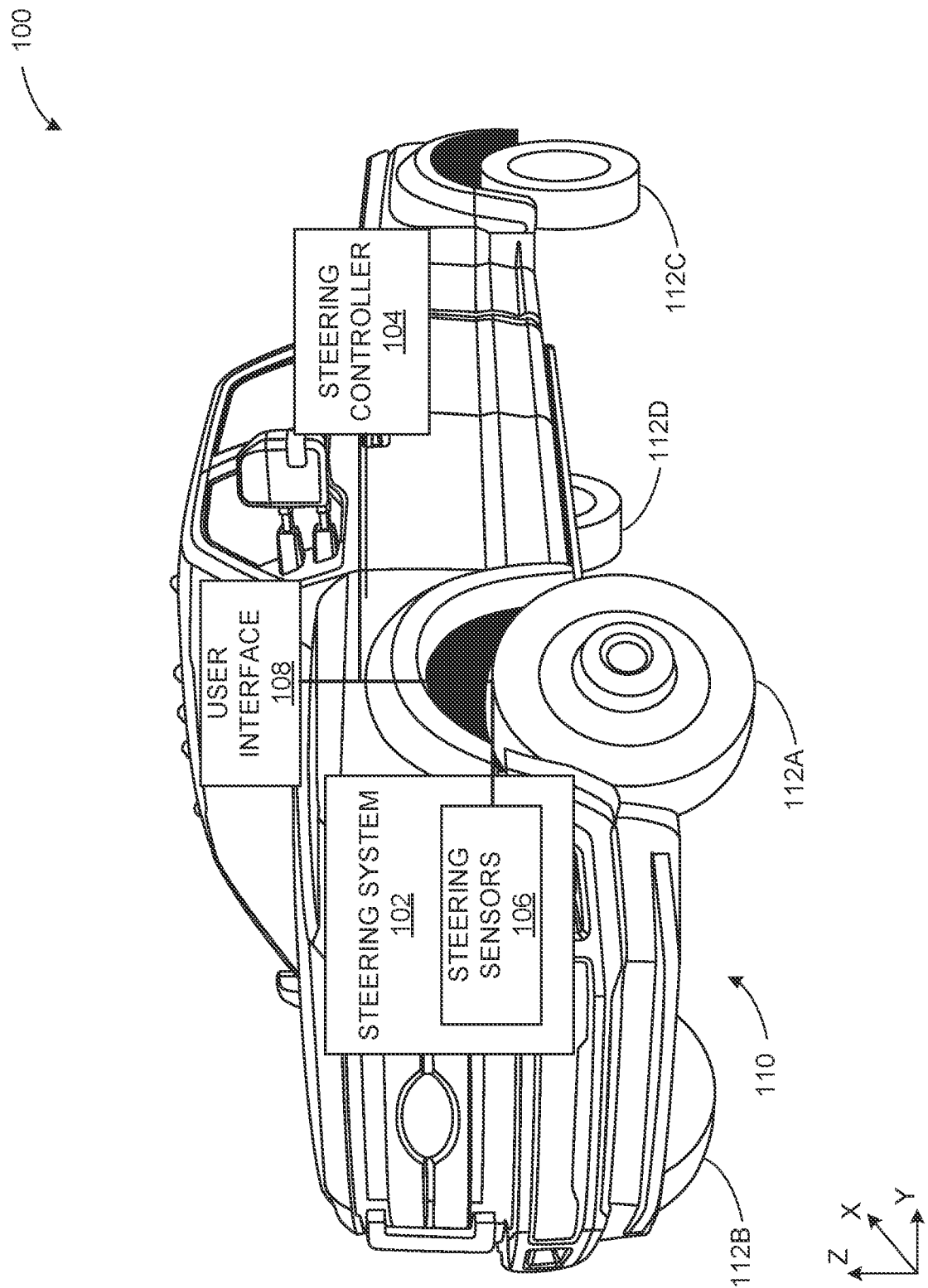
FIG. 1 is a perspective view of a vehicle in which examples disclosed herein can be implemented.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

DETAILED DESCRIPTION

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" refer to dimensions or values that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

As used herein, the orientation of features is described with reference to a lateral axis, a vertical axis, and a longitudinal axis of the vehicle associated with the features. As used herein, the longitudinal axis of the vehicle is parallel to a centerline of the vehicle. The terms "rear" and "front" are used to refer to directions along the longitudinal axis closer to the rear of the vehicle and the front of the vehicle, respectively. As used herein, the vertical axis of the vehicle is perpendicular to the ground on which the vehicle rests. As used herein, the lateral axis of the vehicle is perpendicular to the longitudinal and vertical axes and is generally parallel to the axles of the vehicle. As used herein, the terms "longitudinal," and "axial" are used interchangeably to refer to directions parallel to the longitudinal axis. As used herein, the terms "lateral" and "horizontal" are used to refer to directions parallel to the lateral axis. As used herein, the term "vertical" and "normal" are used interchangeably to refer to directions parallel to the vertical axis.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

A stowable steering wheel can be used to provide additional room in a vehicle cabin for multiple uses. For example, a driver entering or exiting a vehicle can have additional space to maneuver. Power steering system components in addition to the steering wheel can include a steering column, a steering coupler, steering gear, and a power steering pump. Electric power steering systems, as compared to hydraulic systems, can include additional and/or different components such as sensors, actuators, motors, and an electronic control unit. Hydraulic power steering relies on hydraulic pressure supplied by an engine-driven pump. Electric power steering systems use an electric motor that is attached to the steering rack or the steering column, while the electronic control unit determines the steering dynamics.

Known steering systems include rack and pinion systems as well as steering box systems. Rack and pinion systems rely on a gear wheel (e.g., a pinion) at the base of the steering column that causes a rack to translate from side to side, propagating the motion to the road wheels. For example, the pinion gear can be connected to a steering shaft such that as the steering wheel turns, the pinion gear rotates while moving the rack in a linear motion. As such, when the wheel is turned, the pinion gear rotates, moving the rack in a back-and-forth motion that turns the wheels left or right. In contrast to the rack and pinion systems, the steering box systems include worm gears, which can be used to move a drop arm linked by a track rod to a steering arm, resulting in the movement of the front wheels.

In vehicles that include a stowable steering wheel, it is necessary to return a steering wheel position back to the center before the steering wheel is stowed. While the steering position can be returned to the center when actuators are providing forces to hold a steering position, residual forces caused by the suspension system and the steering system, compensated for by the actuators, can cause the steering wheel to rotate after the disengagement of the actuators. As such, when a vehicle is turned off (e.g., when parked, etc.) and the actuators of the steering assist system are disengaged, the angular or rotational position of the steering wheel can change, which can prevent the stowing of the steering wheel. As used herein, the rotation of the steering wheel and/or steering column after the disengagement of a power steering system is referred to as "recoil rotation."

Examples disclosed herein enable a steering wheel of a vehicle to be adjusted to a desired rotational position by compensating for residual forces from the suspension system, the tires, and steering system that occur after the steering assist of a vehicle is disengaged. In some examples disclosed herein, an angular offset from the desired position is determined based on a relationship between a first parameter and a second parameter observed during the initial rotation of the steering wheel. In some examples disclosed herein, the first parameter corresponds to a position of the steering system and the second parameter corresponds to a load on the steering system. The examples disclosed herein enable the centering of a steering wheel in a single rotation without the need to determine the magnitude of a recoil rotation directly. The examples disclosed herein enable the dynamically response to driving conditions such as the coefficient of friction of the road. In some examples disclosed herein, after adjusting the rotational position of the steering wheel to an angular offset beyond the target position, the steering assist is disengaged, and the recoil rotation causes the steering wheel to rotate back to the target position.

FIG. 1 is a perspective view of a vehicle 100 in which examples disclosed herein can be implemented. In the illustrated example of FIG. 1, the vehicle 100 includes an example steering system 102, an example steering controller 104, example steering sensors 106, an example user interface 108, an example suspension system 110, an example first tire 112A, an example second tire 112B, an example third tire 112C, and an example fourth tire 112D.

The vehicle 100 is a motorized wheel-driven vehicle. In the illustrated example of FIG. 1, the vehicle 100 is a pick-up truck. In other examples, the vehicle 100 can be any type of wheeled vehicle (e.g., a sedan, a coupe, a van, a sports utility vehicle, an all-terrain vehicle (ATV), farming equipment, etc.). In some examples, the vehicle 100 includes an internal combustion engine (e.g., a non-electrified vehicle, a partially electrified vehicle, etc.). In other examples, the vehicle 100 is a fully electric vehicle.

The steering system 102 allows a user of the vehicle 100 to control/steer the vehicle 100. In the illustrated example of FIG. 1, the steering system 102 includes a mechanical linkage between a user interface of the vehicle 100 (e.g., a steering wheel, etc.) and the wheels of the vehicle 100 (e.g., via a steering column and rack and pinion system, etc.). In other examples, the steering system 102 can be a steer-by-wire system and/or a partially steer-by-wire system. In the illustrated example of FIG. 1, the steering system 102 includes an electric powered steering system. In other examples, the steering system 102 can include any suitable type of powered steering and/or steering assist (e.g., hydraulic, hybrid electro-hydraulic systems, etc.). In some examples, the steering system 102 includes an external angle controller, which allows the angle of a steering wheel to be adjusted.

The steering controller 104 controls the steering system 102. For example, the steering controller 104 can calculate an offset angle based on parameters received from sensors of the steering system 102. In some examples, the steering controller 104 determines the offset angle such that after the steering assist of the vehicle 100 is disengaged, the recoil rotation caused by the residual forces of the steering system 102 and the suspension system 110 cause a steering wheel of the steering system 102 to rotate back to the desired position (e.g., centered, etc.). For example, the steering controller 104 can determine the offset angle based on a relationship between parameters of the steering system 102 (e.g., a relationship between a position of the steering system and a load on the steering system, etc.) observed during the initial rotation of the steering wheel. An example implementation of the steering controller 104 is described below in conjunction with FIG. 3. In some examples, some or all of the steering controller 104 can be implemented by an electronic control unit (ECU) of the vehicle 100. In other examples, the steering controller 104 can be implemented by another suitable computer (e.g., another computer of the vehicle 100, a mobile device of a user of the vehicle 100, a remote computer, etc.).

The steering sensors 106 include one or more sensors that measure different metrics related to the steering sensors. For example, the steering sensors 106 can measure the position of a steering wheel, a speed of the steering wheel, a position of the steering system (e.g., a position of the steering rack and pinion, etc.), system parameters related to the power steering system, etc. Example steering sensors 106 are described below in conjunction with FIG. 2.

The user interface 108 enables a user of the vehicle 100 to receive and input information from/to the steering controller 104 and other systems of the vehicle 100. For example, the user interface 108 can be implemented by a display of the vehicle 100. Additionally or alternatively, the user interface 108 can include one or more dash indicator(s), one or more button(s) on the dashboard or steering wheel, one or more speakers, one or more microphones, etc. In some examples, the user interface 108 can be implemented by a mobile device of the user (e.g., a mobile phone, a smartwatch, a tablet, etc.).

The vehicle 100 includes the example suspension system 110. The suspension system 110 can include an independent suspension (e.g., a wishbone suspension, etc.), a solid axle suspension (e.g., a leaf spring suspension, etc.) or a combination thereof (e.g., a front axle independent suspension, a rear axle dependent suspension, etc.). In some examples, the suspension system 110 can exert residual forces on the steering system 102.

The vehicle 100 includes wheels with the tires 112A, 112B, 112C, 112D. During the operation of the vehicle 100 and/or steering system 102, the tires 112A, 112B, 112C, 112D elastically deform due to the weight of the vehicle 100. In some examples, the tires 112A, 112B, 112C, 112D can impart forces on the steering system 102 due to the elastic force (e.g., the spring back force, etc.) exerted by the deformation of the tires 112A, 112B, 112C, 112D and/or the friction of the tires 112A, 112B, 112C, 112D against the driving surface. In some examples, the residual forces are primarily associated with the tires of the steered wheels (e.g., the tires 112A, 112B, etc.). In some examples, the residual forces of the steering system 102, the suspension system 110, and/or the tires 112A, 112B, 112C, 112D can cause the steering system 102 to move of the steering assist is disengaged.

Figure 2:
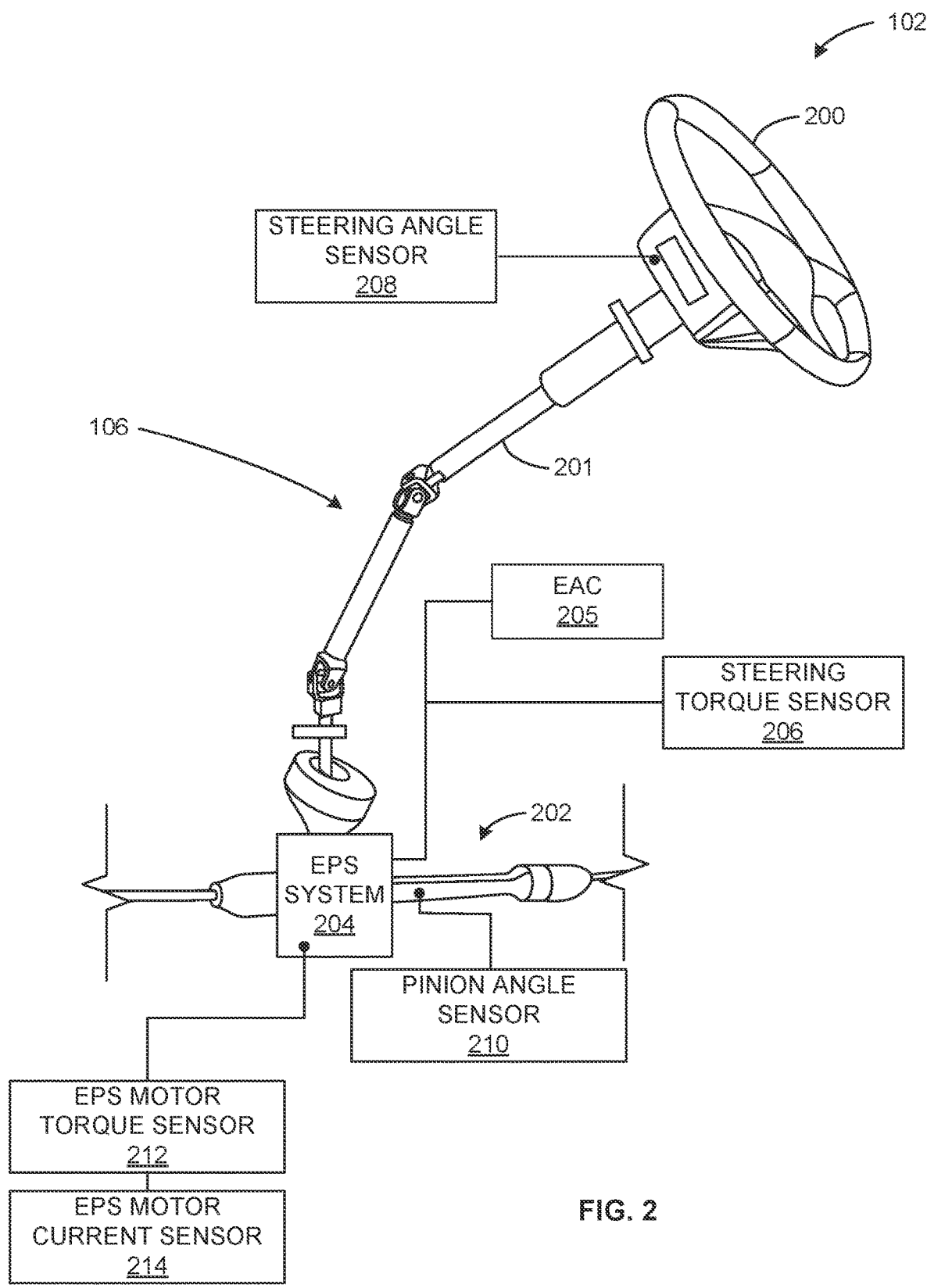
FIG. 2 is a system diagram of the steering system of FIG. 1.

FIG. 2 is a system diagram of the steering system 102 of FIG. 1 that includes the steering sensors 106. The steering system 102 includes an example steering wheel 200, an example steering column 201, an example rack and pinion system 202, an example electric power steering (EPS) system 204, and an external angle controller (EAC) 205. The example steering sensors 106 include an example steering torque sensor 206, an example steering angle sensor 208, an example pinion angle sensor 210, an example EPS motor torque sensor 212, and an example EPS motor current sensor 214.

The steering wheel 200 transmits driver inputs to the steering system 102 (e.g., a user rotating the steering wheel 200, etc.). The steering wheel 200 allows a user of the vehicle to operate the steering system 102 and thereby steer the vehicle 100. In the illustrated example of FIG. 2, the steering wheel 200 is coupled to the steering column 201. The steering wheel 200 includes an interface (e.g., handgrips, etc.) that enables a user to apply torque to the steering system 102. In the illustrated example of FIG. 2, the steering wheel 200 is depicted as circular. In other examples, the steering wheel 200 is not circular. In such examples, the non-circularity or rotational asymmetry of the steering wheel 200 prevents the steering wheel 200 from being stowed when not properly aligned (e.g., not centered, etc.).

The rack and pinion system 202 is a linear actuator that includes a pinion engaged with a rack, which translates rotational inputs from the steering column 201 into linear motion to translate the steering components coupled to the steering column 201. As the driver applies torque to the steering wheel 200, the pinion rotates and provides a linear force to the rack. In the illustrated example of FIG. 2, the EPS system 204 augments torque applied to the steering column 201 by applying additional torque to the steering column 201 and/or the rack and pinion system 202. In some examples, the position of the rack and pinion system 202 can impart a residual force on the steering column 201 that causes the steering wheel 200 to rotate when the EPS system 204 is disengaged.

The EPS system 204 is a power steering system that provides assistance to the user of the vehicle 100 by augmenting the steering effect applied to the steering wheel 200. In the illustrated example of FIG. 2, the EPS system 204 uses an electric motor to provide assistive torque to the steering column 201. In some examples, the EPS system 204 and/or the steering controller 104 can use inputs from the steering torque sensor 206 and/or steering angle sensor 208 to determine an appropriate amount of assistive torque to be applied via the EPS system 204. The EPS system 204 can provide variable amounts of assistive torque depending on the driving condition (e.g., greater amounts of assistive torque at relatively low vehicle speeds, lesser amounts of assistive torque at relatively high vehicle speeds, etc.).

The EAC 205 provides control to the angular position of the steering wheel 200. For example, the EAC 205 can receive commands from the steering controller 104 to adjust the position of the steering wheel 200. For example, the EAC 205 can be used to move (e.g., rotate, etc.) the steering wheel 200 (e.g., using actuators of the EPS system 204, etc.) independent of user-based interaction. In the illustrated example of FIG. 2, the EAC 205 uses the actuators of the EPS system 204. While the EAC 205 is depicted as part of the EPS system 204 in the illustrated example of FIG. 2, the EAC 205 can be a separate component. In such examples, the EAC 205 can have a dedicated actuator independent from the EPS system 204 disposed on the steering system 102 (e.g., the on the steering column 201, on the rack and pinion system 202, etc.).

The steering torque sensor 206 measures the steering torque applied to the steering column 201. In the illustrated example of FIG. 2, the steering torque sensor 206 is disposed near the bottom of the steering column 201 and the EPS system 204. In other examples, the steering torque sensor 206 can be coupled to an upper portion of the steering column 201 (e.g., an input shaft of the steering column 201, an intermediate shaft of the steering column 201, etc.). The steering torque sensor 206 measures the torque exerted by the driver on the steering system 102. In some examples, the steering torque sensor 206 can be implemented by any suitable means of measuring applied torque (e.g., a magnetoelastic torque sensor, a rotary strain gauge, etc.). Additionally or alternatively, the steering torque may be derived from any other suitable measurable quantities.

The steering angle sensor 208 measures an angular or rotational position of the steering wheel 200. In the illustrated example of FIG. 2, the steering angle sensor 208 is disposed adjacent to the steering wheel 200. Additionally or alternatively, the steering angle sensor 208 can be disposed in a steering column 201 of the vehicle (e.g., on an input shaft of the steering wheel 200, on an intermediate shaft, etc.). In some examples, the steering angle sensor 208 can be used to determine whether the steering wheel 200 is centered. As used herein, a steering wheel is "centered" when the steering wheel is in a position associated with the vehicle moving in a direction aligned with the longitudinal axis of the vehicle and all other steering wheel positions corresponding to that position. In some examples, a steering system may have multiple centered positions (e.g., 3, 5, 7, etc.) that correspond to positions offset by a full rotation (e.g., 360 degrees, $2\pi$ radians, etc.) from each other. The steering angle sensor 208 can be implemented by any suitable means of measuring steering angle (e.g., a rotary encoder, an optical encoder, a Hall-effect sensor, a resolver, a magnetic sensor, etc.). Additionally or alternatively, the steering angle may be derived from other metrics (e.g., steering velocity, steering acceleration, steering torque, etc.).

The pinion angle sensor 210 measures the position of a pinion in the rack and pinion system 202. For example, the pinion angle sensor 210 can determine the position of the pinion of the rack and pinion system 202 relative to the rack and/or steering column 201. In some examples, the pinion angle sensor 210 can be implemented by any suitable means of measuring the angular and/or rotational position of the pinion (e.g., an optical sensor, a magnetic sensor, linear position sensor, angular position sensor, inclinometers, etc.). Additionally or alternatively, the pinion angle may be derived from other metrics (e.g., steering velocity, steering acceleration, steering torque, etc.).

The EPS motor torque sensor 212 measures the torque of an electric motor of the EPS system 204. In some examples, the EPS motor torque sensor 212 can be implemented by any suitable means of measuring torque (e.g., a magnetoelastic torque sensor, a rotary strain gauge, etc.). Additionally or alternatively, the EPS motor torque may be derived from any suitable measurable quantities. The EPS motor current sensor 214 measures the electric current of the motor of the EPS system 204. In some examples, the EPS motor current sensor 214 can be implemented by any suitable means of measuring current (e.g., hall-effect sensors, shunt resistor isolated modulators, cored current sensors, coreless current sensors, etc.).

In some examples, residual forces (e.g., spring forces, normal forces, etc.) associated with a vehicle suspension system (e.g., suspension system 110 of FIG. 1, etc.), the steering system 102 (e.g., from the rack and pinion system 202, a tie rod of the steering system 102, etc.) and/or the tires 112A, 112B, 112C, 112D can cause the steering system 102 to rotate after the EPS system 204 and/or the EAC 205 is disengaged from the steering system 102.

Figure 3:
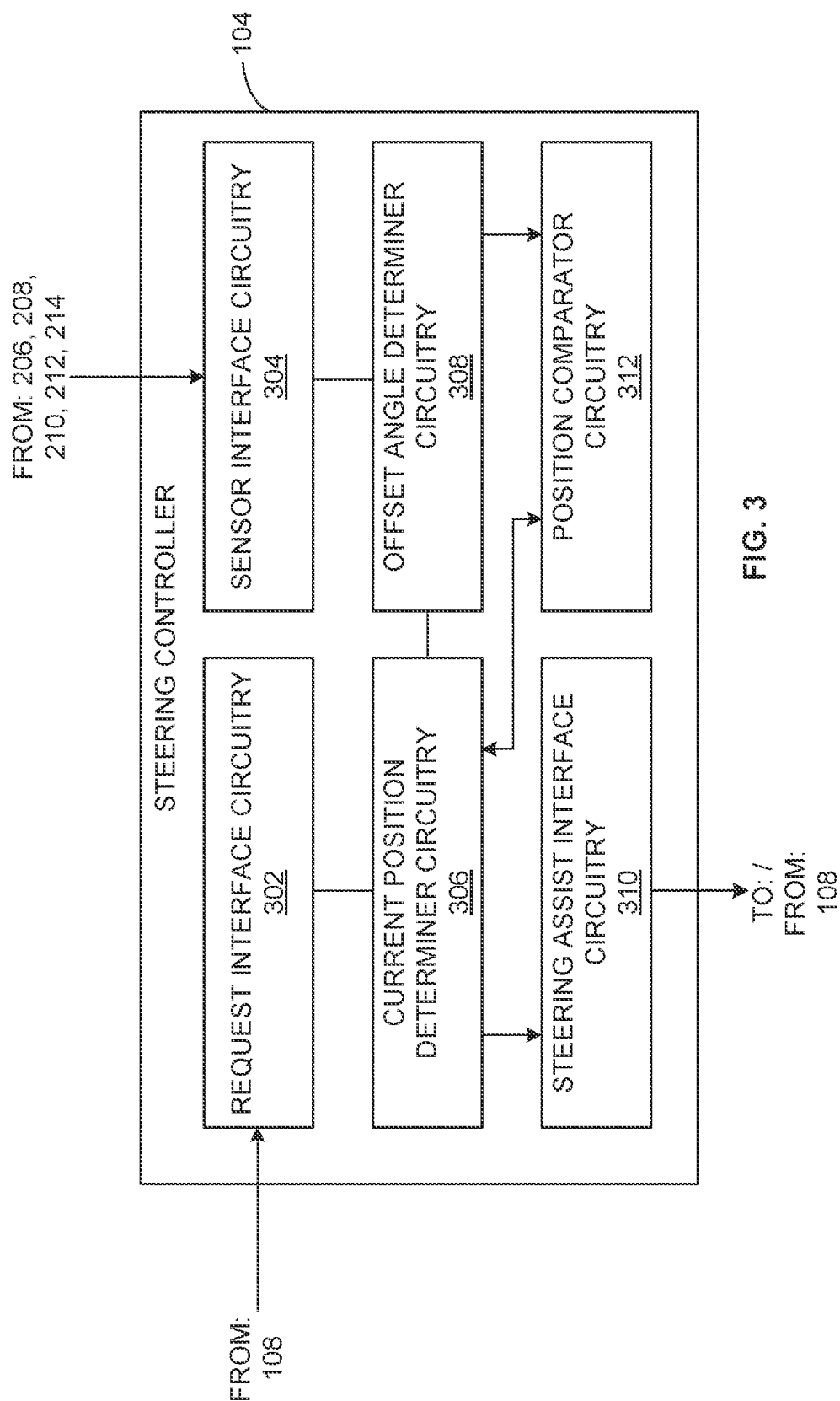
FIG. 3 is a block diagram of an example implementation of the steering wheel controller of FIG. 1.

FIG. 3 is a block diagram of an example implementation of the steering controller 104 of FIG. 1. In the illustrated example of FIG. 3, the steering controller 104 includes example request interface circuitry 302, example sensor interface circuitry 304, example current position determiner circuitry 306, example offset angle determiner circuitry 308, example steering assist interface circuitry 310, and example position comparator circuitry 312.

The request interface circuitry 302 receives (e.g., accesses, detects, etc.) a request from a user of the vehicle 100 to move the steering wheel 200 to a target position. For example, the user can request to center the steering wheel 200 to facilitate the stowing of the steering wheel 200. In other examples, the user can request the steering wheel 200 move (e.g., rotate, articulate, etc.) to any other rotational position. Additionally or alternatively, a request can generated in response to a specific vehicle action (e.g., the vehicle 100 is shifted into park, the parking brake is engaged, etc.) and/or other user input (e.g., the user requests to stow the steering wheel 200, the user requests access to a tray table, the user requests self-driving mode, etc.). In some examples, the request interface circuitry 302 can be in communication with the user interface 108 to detect if the user inputs a request. In other examples, the request interface circuitry 302 can detect a request by any other suitable means.

The sensor interface circuitry 304 receives sensor data from the sensors of the example vehicle 100 and the steering system 102. For example, the sensor interface circuitry 304 can receive input from the steering torque sensor 206, the steering angle sensor 208, the pinion angle sensor 210 the EPS motor torque sensor 212, the EPS motor current sensor 214, and/or any other sensors (e.g., wheel position sensor, weight sensors, etc.). In some examples, the sensor interface circuitry 304 distributes received sensor data to at least one of the current position determiner circuitry 306, the offset angle determiner circuitry 308, the steering assist interface circuitry 310, and the position comparator circuitry 312. In some examples, the sensor interface circuitry 304 can distribute data from the steering angle sensor 208 to the current position determiner circuitry 306, etc.

The current position determiner circuitry 306 determines the current position of the steering wheel 200. For example, the current position determiner circuitry 306 can determine the current position of the steering wheel 200 based on data from (e.g., via the sensor interface circuitry 304, etc.) the steering torque sensor 206 and/or the steering angle sensor 208. In some examples, the current position determiner circuitry 306 can determine the position of the steering wheel relative to the centered position of the steering wheel 200. In other examples, the current position determiner circuitry 306 can determine the current position of the steering wheel 200 by any other suitable means.

The offset angle determiner circuitry 308 determines the offset angle based on an expected recoil rotation caused by the disengagement of the EPS system 204. In such examples, the offset angle determiner circuitry 308 determines the offset angle such that the recoil rotation caused by the disengagement of the EPS system 204 causes the steering wheel 200 to rotate to the target position. In some examples, the offset angle determiner circuitry 308 determines the offset angle based on a relationship between parameters of the sensor data (e.g., received via the sensor interface circuitry 304, etc.) collected during the initial actuation of the steering wheel 200 via the steering assist interface circuitry 310. For example, the offset angle determiner circuitry 308 can, during the initial articulation of the steering wheel 200 and based on sensor data collected by the sensor interface circuitry 304, determine the rotational displacement (e.g., an angular segment, etc.) over which the mathematical relationship between a first parameter associated with a position of the steering system 102 (e.g., steering wheel angle, a position of a pinion on a rack, a tie rod position, etc.) and a second parameter associated with a load on a steering system 102 (e.g., a load on a tie rod, a load on a rack, etc.) changes from a first linear relationship to a second relationship (e.g., a second linear relationship, a non-linear relationship, etc.). As used herein, a "linear relationship" refers to a relationship between parameters that are approximately linear. The relationship between parameters with a linear relationship can include noise and/or other minor variations. In some examples, the offset angle determiner circuitry 308 can access the first parameter and/or the second parameter from the sensor data received via the sensor interface circuitry 304. Additionally or alternatively, the offset angle determiner circuitry 308 can determine the first parameter and/or the second parameter based on the sensor data received via the sensor interface circuitry 304 (e.g., derive the parameters from the sensor data, etc.).

The offset angle determiner circuitry 308 can determine the offset angle based on the rotational displacement. For example, the offset angle determiner circuitry 308 can determine the offset angle to be equal to the observed rotational displacement. In other examples, the offset angle determiner circuitry 308 can determine the offset angle by any other suitable means (e.g., a weighted factor of the rotational displacement, a sum of a rotational displacement and another value, etc.). Additionally or alternatively, the offset angle determiner circuitry 308 can estimate the load on the rack and pinion system 202 based on sensor data received from the steering torque sensor 206, the steering angle sensor 208, the pinion angle sensor 210, the EPS motor torque sensor 212, the EPS motor current sensor 214, etc. to dynamically determine the offset angle.

The steering assist interface circuitry 310 interfaces with the steering system 102. For example, the steering assist interface circuitry 310 can cause the EPS system 204 to engage and/or disengage with the steering column 201. In some examples, the steering assist interface circuitry 310 causes the EAC 205 to rotate the steering column 201 and/or steering wheel 200 to a position (e.g., an offset angle past the target position, etc.). In some examples, the steering assist interface circuitry 310 can cause the steering wheel 200 to retract into a stowed position.

The position comparator circuitry 312 compares the current position of the steering wheel 200 (e.g., as determined by the current position determiner circuitry 306, etc.) to the target position of the steering wheel 200. For example, the position comparator circuitry 312 can determine the difference between the current position of the steering wheel 200 and the target position of the steering wheel 200. In some examples, the position comparator circuitry 312 can compare the determined difference to a threshold difference. In some such examples, if the position comparator circuitry 312 determines the difference satisfies the threshold, the position comparator circuitry 312 causes the steering assist interface circuitry 310 to stow the steering wheel 200. In some such examples, if the position comparator circuitry 312 determines the difference does not satisfy the difference threshold, the position comparator circuitry 312 causes the offset angle determiner circuitry 308 and steering assist interface circuitry 310 to repeat the offset angle determination and steering wheel position adjustment process. In some examples, the threshold difference is based on the allowable positions of the steering wheel 200 that enable the stowing of the steering wheel 200 (e.g., +/−1 degree, +/−3 degrees, etc.). In other examples, the threshold difference can be any other suitable value.

While an example manner of implementing the steering controller 104 of FIG. 1 is illustrated in FIG. 3, one or more of the elements, processes, and/or devices illustrated in FIG. 3 may be combined, divided, re-arranged, omitted, eliminated, and/or implemented in any other way. Further, the example request interface circuitry 302, the example sensor interface circuitry 304, the example target position determiner circuitry 306, the example current position determiner circuitry 308, the example steering assist interface circuitry 310, the example position comparator circuitry 312, and/or, more generally, the example steering controller 104 of FIG. 1, may be implemented by hardware, software, firmware, and/or any combination of hardware, software, and/or firmware. Thus, for example, any of the example request interface circuitry 302, the example sensor interface circuitry 304, the example target position determiner circuitry 306, the example current position determiner circuitry 308, the example steering assist interface circuitry 310, the example position comparator circuitry 312, and/or, more generally, the example steering controller 104 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example request interface circuitry 302, the example sensor interface circuitry 304, the example target position determiner circuitry 306, the example current position determiner circuitry 308, the example steering assist interface circuitry 310, the example position comparator circuitry 312 is/are hereby expressly defined to include a non-transitory computer readable storage device or storage disk such as a memory, a digital versatile disk (DVD), a compact disk (CD), a Blu-ray disk, etc., including the software and/or firmware. Further still, the example steering controller 104 of FIG. 1 may include one or more elements, processes, and/or devices in addition to, or instead of, those illustrated in FIG. 3, and/or may include more than one of any or all of the illustrated elements, processes and devices.

FIG. 4A illustrates the example steering wheel 200 in an example first position 402. In the illustrated example of FIG. 4A, the steering wheel 200 has been moved, turned, rotated, etc. by a user of the vehicle 100 into the first position 402. In the illustrated example of FIG. 4A, the first position 402 (e.g., a starting position, etc.) is angularly displaced from an example second position 404 by an example first angle 405 ($\Theta_A$ in the illustrated example of FIG. 4A). In some examples, a user of the vehicle 100 has maneuvered the vehicle 100 into a situation where it is appropriate to stop the vehicle 100 (e.g., parked in a parking space, parallel parked, etc.). In the illustrated example of FIG. 4A, in the process of making these maneuvers, the steering wheel 200 is not centered and cannot be properly stowed closer to the vehicle dashboard. In the illustrated example of FIG. 4A, the actuators of the EPS system 204 are engaged with the steering column 201.

A user (e.g., a driver of the vehicle 100 of FIG. 1, etc.) has requested to move the steering wheel to the second position 404 (e.g., to stow the steering wheel 200, etc.). In some examples, the second position 404 corresponds to the position of the steering wheel 200 that enables the steering wheel 200 to be properly stowed (e.g., a centered position, a target position, etc.). In other examples, the second position 404 can correspond to any other suitable steering wheel angular or rotational position and/or corresponding position of the wheels of the vehicle 100. In the illustrated example of FIG. 4A, after receiving the user request, the EAC 205 (FIG. 2), via a command from the steering controller 104 (e.g., the steering assist interface circuitry 310, etc.), causes the steering wheel 200 to undergo an example first rotation 406 towards the second position 404. For example, the EAC 205 can cause one or more actuators of the EPS system 204 (FIG. 2) to apply torque to the steering column 201 (FIG. 2).

FIG. 4B illustrates the example of steering wheel 200 in an example third position 407 while undergoing the first rotation 406. In the illustrated example of FIG. 4B, the third position 407 is angularly displaced from the example first position 402 by an example second angle 408 ($\Theta_B$ in the illustrated example of FIG. 4B). In the illustrated example of FIG. 4B, the steering wheel 200 is undergoing the example first rotation of FIG. 4A and the third position 407 is an intermediate position between the first position 402 and the second position 404. In the illustrated example of FIG. 4B, the third position 407 represents the position where a first parameter associated with a position of the steering system 102 (e.g., a steering wheel angle, a position of a rack and pinion system 202, a position of a tie rod, etc.) and a second parameter associated with a load on the steering system 102 (e.g., a load on the rack and pinion system, a load on the steering column 201, a load on a tie rod of the steering system 102, etc.) changes from a first linear relationship to second relationship (e.g., a second linear relationship having a substantially different slope, a non-linear relationship, etc.). In some examples, the magnitude of second angle 408 is stored by the steering controller 104 and/or used to calculate an offset angle, which is described below in conjunction with FIG. 4D. In the illustrated example of FIG. 4B, the second angle 408 corresponds to the amount of residual force in the steering system 102. Particularly, the second angle 408 corresponds to the force applied to the steering system 102 and corresponding movement of the steering wheel 200 required to saturate (e.g., tension, etc.) the steering system 102, the suspension system 110, and the tires of the steered wheels (e.g., the tires 112A, 112B, etc.). In some examples, empirical observation indicates that the second angle 408 is approximately equal to the angular offset 414. Accordingly, in some examples, the magnitude of the second angle 408 can be used by the steering controller 104 to estimate the required angular offset to compensate for the recoil observation.

FIG. 4C illustrates the example of steering wheel 200 in an example second position 404 while undergoing the first rotation 406. In the illustrated example of FIG. 4C, the steering wheel 200 has reached the example second position 404. However, if the first rotation 406 were to stop, residual forces (e.g., from the steering system 102 of FIGS. 1 and 2, the suspension system 110 of FIG. 1, the tires 112A, 112B, etc.) would cause the steering wheel 200 to rotation in an opposite direction of the first rotation 406 and no longer be in the second position 404. Accordingly, the steering wheel 200 continues to rotate the steering wheel 200 past the second position 404.

FIG. 4D illustrates the example of steering wheel 200 in an example fourth position 412 after the rotation 406 has ceased. In the illustrated example of FIG. 4D, the fourth position 412 is offset from the second position 404 by an example angular offset 414. In the illustrated example of FIG. 4D, an actuator associated with the power steering system (e.g., the EPS system 204 of FIG. 2, etc.) and/or EAC (e.g., the EAC 205 of FIG. 2, etc.) remains engaged on a steering column (e.g., the steering column 201 of FIG. 2, etc.) associated with FIG. 2. In the illustrated example of FIG. 4D, the angular offset 414 is equal in magnitude to the second angle 408. In other examples, the angular offset 414 can be calculated by any other suitable means. The angular offset 414 is an estimate of the expected recoil rotation associated with the steering wheel 200, which is described below in relation to FIG. 4E.

FIG. 4E illustrates the example steering wheel 200 after the disengagement of an actuator of the EAC 205 and/or the EPS system 204. In the illustrated example of FIG. 4E, the steering wheel 200 has undergone an example second rotation 416 (e.g., a recoil rotation, etc.) to the second position 404. Because the steering controller 104 determined the angular offset 414 to compensate for the second rotation 416, the second rotation 416 causes the steering wheel 200 to rotate back to the second position 404. In some examples, the steering controller 104 can incorrectly determine the angular offset 414 and not reach the second position 404 after the second rotation 416. In some such examples, the steering controller 104 can determine the steering wheel 200 is able to be stowed (e.g., within a threshold distance from the second position 404, etc.). In such examples, the steering controller 104 causes the steering wheel 200 to be stowed. In other examples, if the steering controller 104 determines the steering wheel 200 is not able to be stowed, the steering controller 104 can reengage the EPS system 204 and repeat the steps illustrated in FIGS. 4A-4E. In such examples, the current position of the steering wheel (e.g., the position of the steering wheel 200 after the second rotation 416, etc.) is treated as the initial position of the steering wheel (e.g., the first position 402 of FIG. 3 4A, etc.) and the process set forth in FIGS. 4A-4E are repeated.

Figure 5:
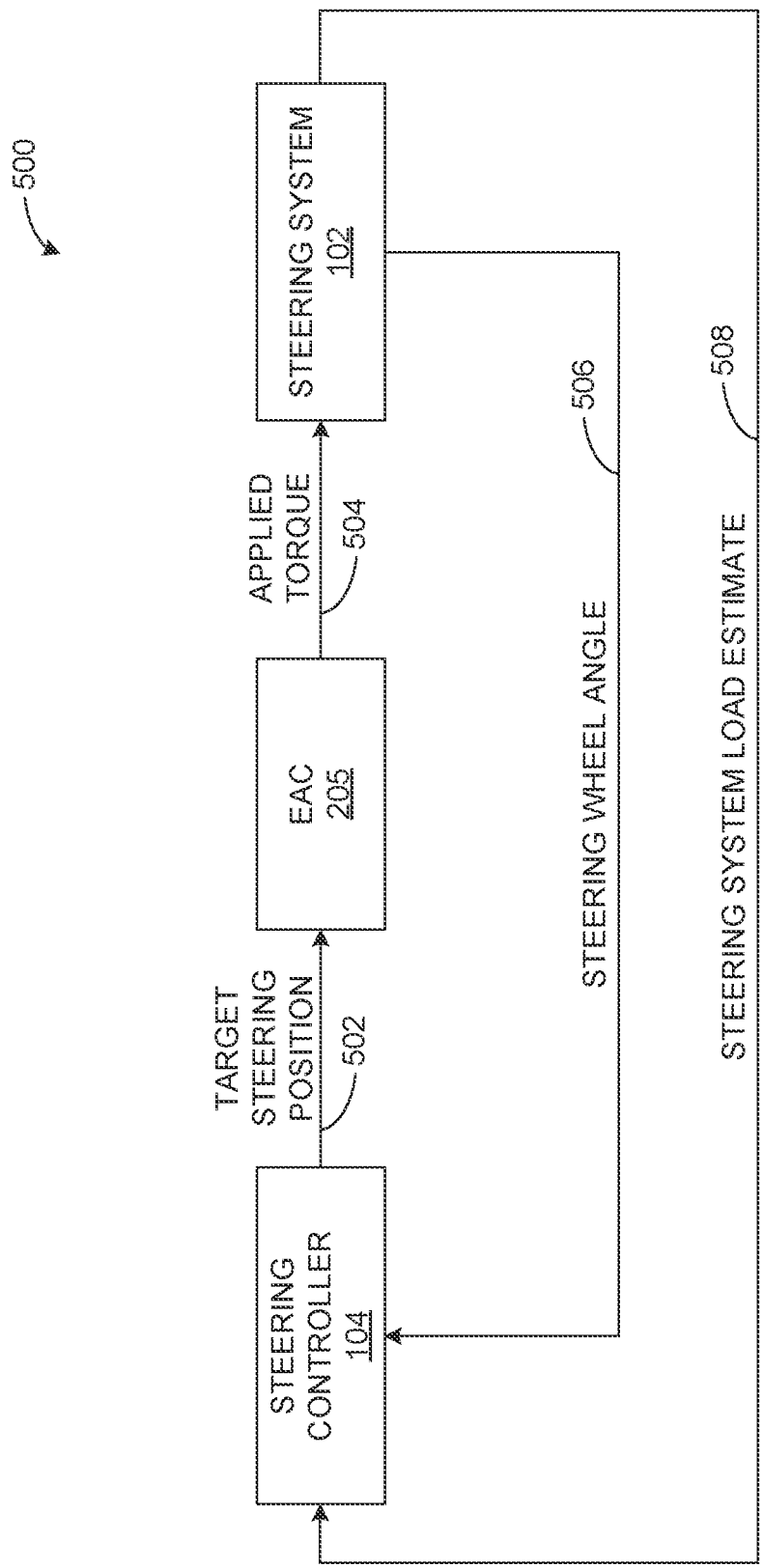
FIG. 5 is a process control diagram that may be used in conjunction with the steering controller of FIGS. 1 and 3.

FIG. 5 is a process control diagram 500 that may be used in conjunction with the steering controller of FIGS. 1 and 3. In the illustrated example of FIG. 5, the example steering controller 104 of FIGS. 1 and 3 provides a feedforward signal 502 to the example EAC 205 of FIG. 2. In the illustrated example of FIG. 5, the EAC 205 applies a torque 504 to the steering system 102, which provides a first example feedback signal 506 and a second example feedback signal 508 to the steering controller 104. While described herein as electrical signals (e.g., wired electrical signals, wireless electrical signals, etc.), the signals 502, 506, 508 can be any other suitable types of signals (e.g., hydraulic signals, mechanical signals, pneumatic signals, etc.).

In the illustrated example of FIG. 5, the steering controller 104, in response to a user request to move the steering wheel 200, provides a feedforward signal 502 to the EAC 205 to move the steering wheel 200 to a target position (e.g., the second position 404, etc.). The EAC 205 applies a torque 504 to the steering system 102, thereby causing the steering column 201 and the steering wheel 200 to rotate. As the steering wheel 200 rotates, the sensors 206, 208, 210, 212, 214 provide the feedback signals 506 to the steering controller 104. In the illustrated example of FIG. 5, The feedback signals 506, 508 enables the offset angle determiner circuitry 308 to determine the calculate the offset angle. In the illustrated example of FIG. 5, the first feedback signal 506 corresponds to the position of the steering wheel (e.g., as continuously and/or periodically measured by the steering angle sensor 208 of FIG. 2). In the illustrated example of FIG. 5, the second feedback signal 508 corresponds to a load on the steering system 102, which can be determined based on the data from sensors 206, 208, 210, 212, 214 and/or properties of the steering system 102 (e.g., geometric properties, material properties, etc.). In other examples, the feedback signal 508 can be determined directly by a sensor (e.g., a strain gauge, etc.) disposed on the steering system 102.

Figure 6:
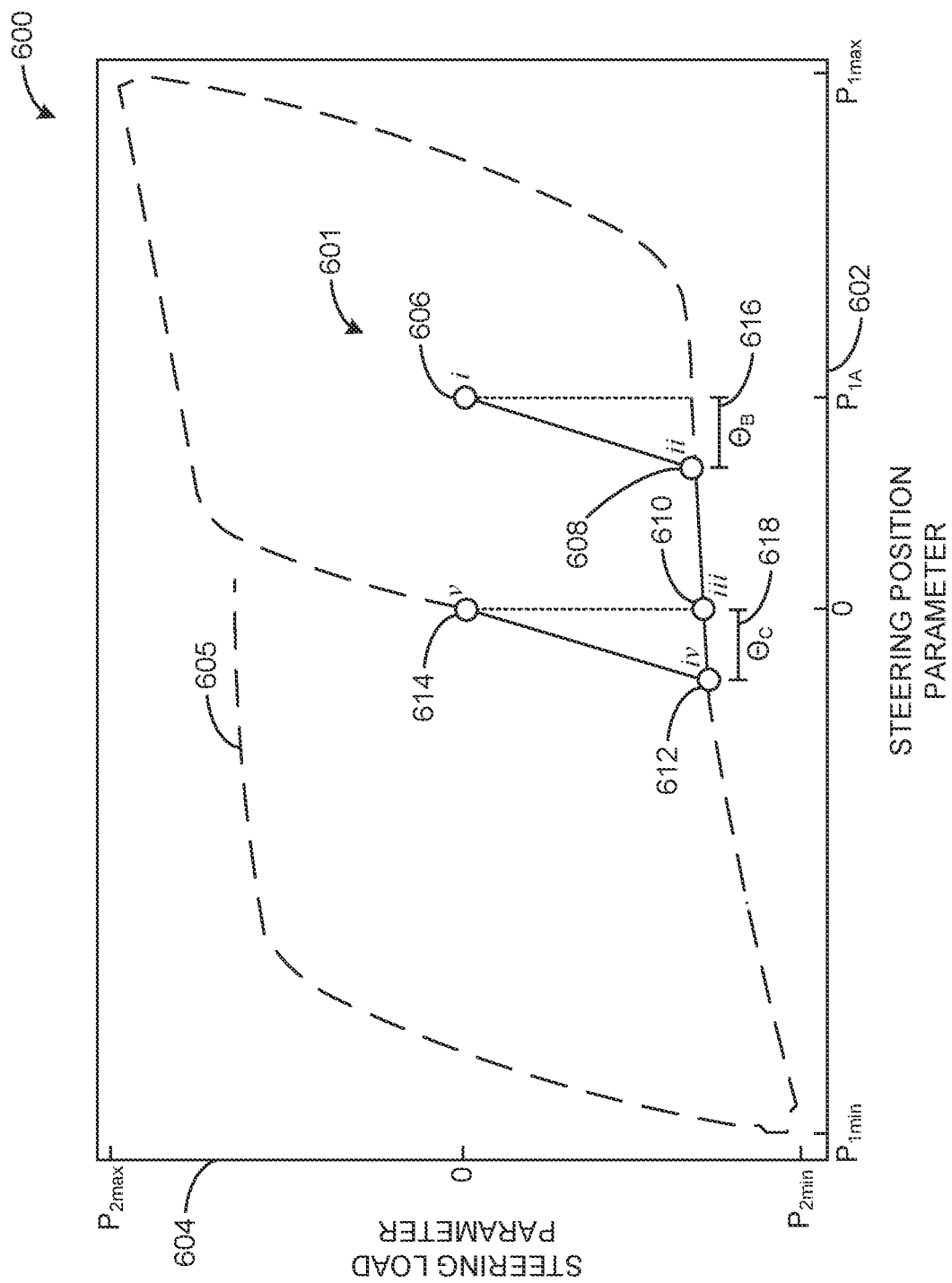
FIG. 6 is a diagram illustrating an operation related to the process control diagram of FIG. 5 and/or the illustrations of FIGS. 4A-4E.

FIG. 6 is a diagram 600 illustrating an example operation 601 to the center the steering system 102 related to the process control diagram of FIG. 5. In the illustrated example, the diagram 600 includes an example x-axis 602, corresponding to a position of a steering system, and an example y-axis 604, corresponding to a load on a steering system. The example diagram 600 illustrates an example relationship curve 605 between the position of the steering system and the load on the steering system. During operation of the steering controller 104 acting in accordance with the teachings of this disclosure, the steering system begins at an example first state 606 and move sequentially through an example second state 608, an example third state 610, an example fourth state 612, and an example fifth state 614. The first state 606 generally corresponds to the state of the steering wheel 200 in FIG. 4A. The second state 608 generally corresponds to the state of the steering wheel 200 in FIG. 4B. The third state 610 generally corresponds to the state of the steering wheel 200 in FIG. 4C. The fourth state 612 generally corresponds to the state of the steering wheel 200 in FIG. 4D. The fifth state 614 generally corresponds to the state of the steering wheel 200 in FIG. 4E.

The example x-axis 602 reflects the position of the steering system 102. For example, the parameter measured on the x-axis 602 can include an angular position of the steering wheel 200 of FIG. 2 or another analogous parameter (e.g., a position of tie rod of the steering system 102, a position of the rack and pinion system 202, etc.). The minimum value of the x-axis 602 (illustrated as $P_{1min}$) corresponds to a maximum travel of the steering system 102 in a particular rotational direction (e.g., counterclockwise, etc.). The maximum value of the x-axis 602 (illustrated as $P_{1max}$) corresponds to a maximum travel of the steering system 102 in the other rotational direction (e.g., clockwise, etc.). In the illustrated example of FIG. 6, the center of the x-axis represents the centered position of the steering system 102 and/or the steering wheel 200 (illustrated as 0).

The example y-axis 604 reflects a load on the steering system 102. For example, the parameter measured on the y-axis 604 can include a load on the rack of the rack and pinion system 202 of FIG. 2 or another analogous parameter (e.g., a load on a tie rod of the steering system 102, a load on the steering system, etc.). The minimum value of the y-axis 604 (illustrated as $P_{2min}$) corresponds to the load of the steering system 102 associated with a corresponding maximum travel of the steering system 102 in a particular rotational direction (e.g., counterclockwise, etc.). The maximum value of the y-axis 604 (illustrated as $P_{2max}$) corresponds to the load of the steering system 102 associated with a corresponding maximum travel of the steering system 102 in the other rotational direction (e.g., clockwise, etc.). In the illustrated example of FIG. 6, the center of the y-axis represents a load of zero on the steering system 102 (illustrated as 0), which generally corresponds to a state where the EPS system 204 and/or the EAC 205 is not engaged.

The relationship curve 605 illustrates the relationship between the first parameter of the x-axis 602 and the second parameter of the y-axis 604. In the illustrated example of FIG. 6, the relationship curve 605 represents the relationship between the parameters when the steering system 102 is loaded (e.g., the EPS system 204 is engaged, etc.). As such, in some examples (e.g., moving between the first state 606 and the second state 608, etc.), the initial loading and/or movement may be necessary to cause the steering system 102 to move on the relationship curve 605.

In the illustrated example of FIG. 6, the steering system 102 begins the operation 601 in the first state 606. In the first state 606, the vehicle 100 is stationary (e.g., parked, etc.) and the steering system 102 is in a non-centered position (illustrated as $P_{1A}$) and a user of the vehicle 100 requests the steering wheel 200 of FIG. 2 be centered. The EAC 205 engages the steering column 201 applies a load to the steering system, which increases the magnitude of the total load on the steering system and moves the position of the steering system 102 towards the centered position. When the steering system 102 reaches the second state 608 (e.g., the saturated state, etc.), the steering controller 104 can record (e.g., store, note, etc.) an example angular displacement 616 (illustrated as $\Theta_B$) of the steering system 102 between the first state 606 and the second state 608. The angular displacement 616 corresponds to a portion of the operation 601 where the relationship between the steering load parameter and the steering position parameter has a first linear relationship (e.g., a first slope, etc.). In some examples, the angular displacement 616 is associated with steering load required to overcome the residual forces of the steering system 102 of FIG. 1, the suspension system 110 of FIG. 1, and/or the tires 112A, 112B, 112C, 112D of FIG. 1.

After the operation 601 has reached the second state 608, the EAC 205 continues to apply torque to the steering column, which continues to change the position of the steering system 102 until the third state 610 (e.g., loaded center state, etc.) is reached. As the EAC 205 continues to apply torque to the system, the relationship between the steering load parameter and the steering position parameter changes from the first linear relationship to a second relationship (e.g., a second linear relationship, a non-linear relationship, etc.). While the transition between the second state 608 and the third state 610 is depicted as linear, in other examples, the transition can have any suitable relationship (e.g., quadratic, hyperbolic, trigonometric, etc.). In the third state 610, the steering system 102 is centered. However, if the EAC 205 and/or the EPS system 204 is disengaged, the residual force remaining in the steering system 102 will cause the steering system 102 to recoil towards the initial position of the steering system 102. As such, the EAC 205 continues to apply torque to the steering column 201 until the fourth state 612 (e.g., the overshoot position, etc.) is reached. In the illustrated example of FIG. 6, the fourth state 612 is displaced along the x-axis 602 by an example offset displacement 618 (illustrated as Oc). In the illustrated example of FIG. 6, the offset displacement 618 is approximately equal in magnitude to the angular displacement 616. In other examples, the relationship between the offset displacement 618 and the angular displacement 616 can be any suitable value. After the operation 601 reaches the fourth state 612, the EAC 205 is disengaged. The residual load on the steering system 102 causes the steering system 102 to undergo a recoil rotation to the fifth state 614. Because the position of the fourth state 612 on the x-axis was determined to compensate for this recoil rotation, the fifth state 614 is a position where there is no load on the steering system 102 and the steering system 102 is centered.

Figure 7:
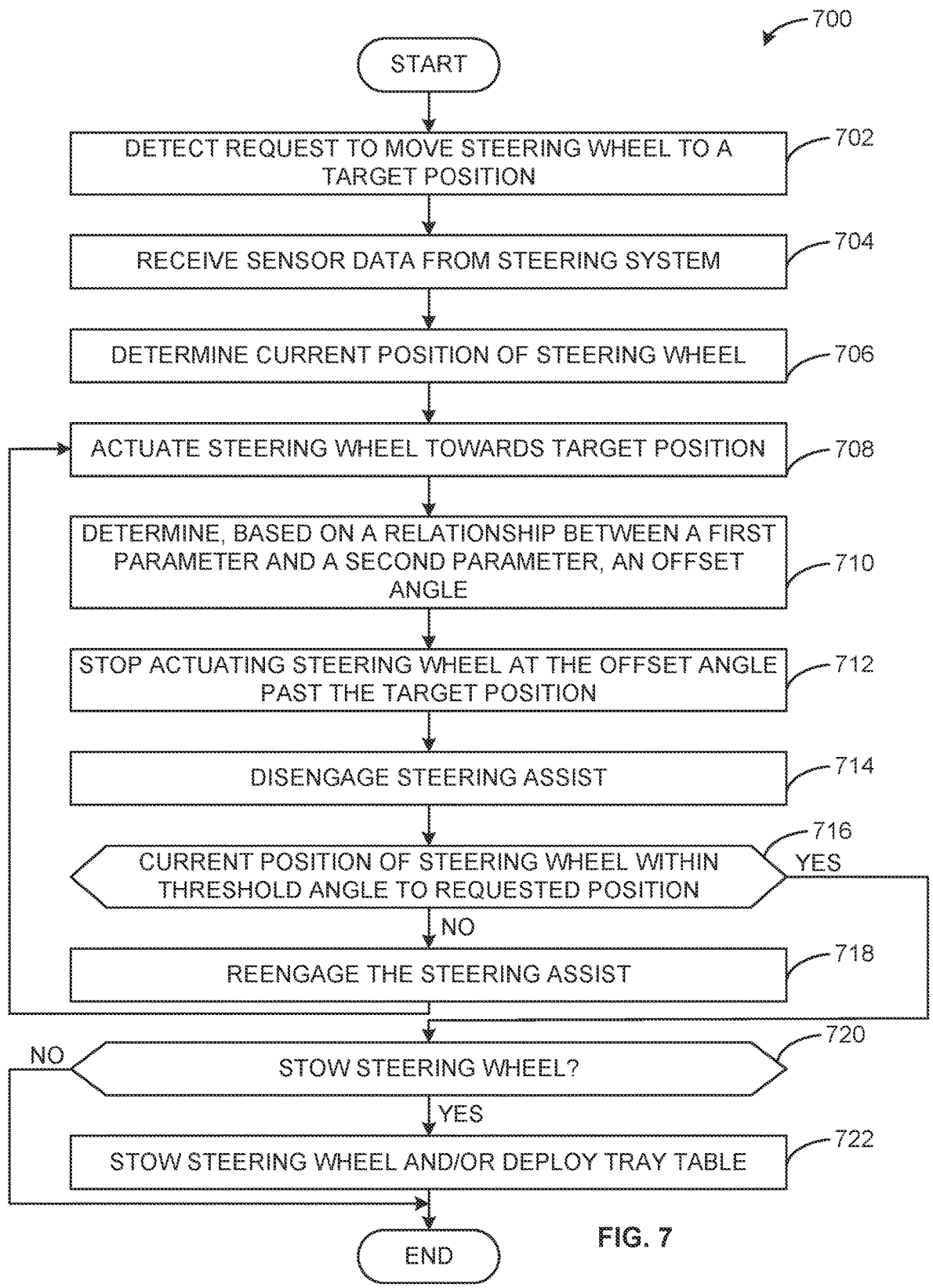
FIG. 7 is a flowchart representative of example machine readable instructions that may be executed by example processor circuitry to implement the steering controller of FIGS. 1 and/or 3.

A flowchart representative of example hardware logic circuitry, machine readable instructions, hardware implemented state machines, and/or any combination thereof for implementing the steering controller 104 of FIGS. 1 and 3 is shown in FIG. 7. The machine readable instructions may be one or more executable programs or portion(s) of an executable program for execution by processor circuitry, such as the processor circuitry 812 shown in the example processor platform 800 discussed below in connection with FIG. 8 and/or the example processor circuitry discussed below in connection with FIGS. 8 and/or 9. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 5, many other methods of implementing the example steering controller 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 5 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 7 is a flowchart representative of example machine readable instructions and/or example operation(s) 700 that may be executed and/or instantiated by processor circuitry to adjust a position of the steering wheel 200. The machine-readable instructions and/or operations 700 of FIG. 7 begin at block 702, at which the request interface circuitry 302 detects a request to move the steering wheel 200 to a target position (e.g., the second position 404 of FIGS. 4A-4E, etc.). For example, the request interface circuitry 302 can detect a request to move steering wheel 200 input via the user interface 108. In other examples, the request interface circuitry 302 can detect an automatic request triggered by a vehicle event (e.g., the vehicle be putting park, a request to stow the steering wheel 200, etc.).

At block 704, the sensor interface circuitry 304 receives sensor data from the steering system 102. For example, the sensor interface circuitry 304 can receive sensor inputs from the steering torque sensor 206, the steering angle sensor 208, the pinion angle sensor 210 the EPS motor torque sensor 212, the EPS motor current sensor 214, and/or any other sensors (e.g., wheel position sensor, weight sensors, etc.). In other examples, the sensor interface circuitry 304 can transform a sensor output (e.g., a signal output by a sensor) into a human-readable format (e.g., a number, a string, etc.). In some examples, the sensor interface circuitry 304 continues to collect sensor data during the execution of blocks 704-718.

At block 706, the current position determiner circuitry 306 determines the current position of the steering wheel 200. For example, the current position determiner circuitry 306 can determine the current position (e.g., the first position 402 of FIG. 4A, etc.) of the steering wheel 200 based on one or more sensor readings accessed by the sensor interface circuitry 304. In some examples, the current position determiner circuitry 306 can determine the current position of the steering wheel 200 based on the readings of the steering angle sensor 208. In other examples, the current position determiner circuitry 306 can determine the current position of the steering wheel 200 by any other suitable means.

At block 708, the steering assist interface circuitry 310 actuates steering wheel towards the target position. For example, the steering assist interface circuitry 310 can engage an actuator associated with the EAC 205 and/or the EPS system 204 onto the steering column 201 and thereby cause the steering wheel 200 to rotate towards the target position (e.g., clockwise or counterclockwise, etc.). In some examples, the steering assist interface circuitry 310 can be a closed-loop process and incorporate readings from the steering angle sensor 208 and/or the current position determiner circuitry 306 can provide feedback regarding the position of the steering wheel 200.

At block 710, the offset angle determiner circuitry 308 determines, based on the relationship between a first parameter and a second parameter, an offset angle. For example, the offset angle determiner circuitry 308 can determine the offset angle based on an expected recoil rotation caused by the disengagement of the EPS system 204. In some such examples, the offset angle determiner circuitry 308 determines the offset angle based on a relationship between parameters of the sensor data (e.g., received via the sensor interface circuitry 304, etc.) collected during the initial actuation of the steering wheel 200 via the steering assist interface circuitry 310 at block 708. For example, the offset angle determiner circuitry 308 can, during the initial articulation of the steering wheel 200 (e.g., started during the execution of block 708, etc.), based on sensor data collected by the sensor interface circuitry 304, determine the rotational displacement (e.g., an angular segment, etc.) over which the mathematical relationship between a first parameter associated with a position of the steering system 102 (e.g., steering wheel angle, a position of a pinion on a rack, a tie rod position, etc.) and a second parameter associated with a load on a steering system 102 (e.g., a load on a tie rod, a load on a rack, etc.) changes from a first linear relationship to a second relationship (e.g., a second linear relationship, a non-linear relationship, etc.).

At block 712, the steering assist interface circuitry 310 stops actuating the steering system 102 at the offset angle past the target position. For example, the steering assist interface circuitry 310, can via feedback from the steering angle sensor 208 and/or the current position determiner circuitry 306, determine the current position is the offset angle past the target position. In some examples, after a position the offset angle past the target position has been reached, the steering assist interface circuitry 310 can cause an actuator associated with the EAC 205 and/or the EPS system 204 to stop applying a torque to the steering column 201.

At block 714, the steering assist interface circuitry 310 disengages the steering assist. For example, the steering assist interface circuitry 310 can cause an actuator of the EAC 205 and/or EPS system 204 to disengage from the steering column 201. In other examples, the steering assist interface circuitry 310 can cause the steering assist to disengage by any other suitable means. In some examples, the disengagement of the steering assist causes the steering wheel 200 to undergo a recoil rotation (e.g., the second rotation 416 of FIG. 4E, etc.).

At block 716, the position comparator circuitry 312 determines if the current position of steering wheel is within a threshold angle to requested position. For example, the position comparator circuitry 312 can compare the difference between the current position and the request position to a threshold difference. In some such examples, if the position comparator circuitry 312 determines the difference satisfies the threshold, the operation 700 advances to block 720. If the position comparator circuitry 312 determines the difference does not satisfy the difference threshold, the operation 700 advances to block 718.

At block 718, the steering assist interface circuitry 310 reengages the steering assist. For example, the steering assist interface circuitry 310 can cause an actuator of the EAC 205 and/or EPS system 204 to engage the steering column 201. In other examples, the steering assist interface circuitry 310 can cause the steering assist system to be reengaged At block 720, the steering assist interface circuitry 310 determines if the steering wheel 200 is to be stowed. For example, the steering assist interface circuitry 310 can determine if the user has input a request to stow the steering wheel. In other examples, the steering assist interface circuitry 310 can determine if the steering wheel is going to be stowed by any other suitable means. If the steering wheel is to be stowed, the operation 700 advances to block 722. If the steering wheel is not to be stowed, the operation ends. At block 722, the steering assist interface circuitry 310 stows the steering wheel. For example, the steering assist interface circuitry 310 can cause the steering wheel 200 to be stow. The operation 700 then ends.

Figure 4:
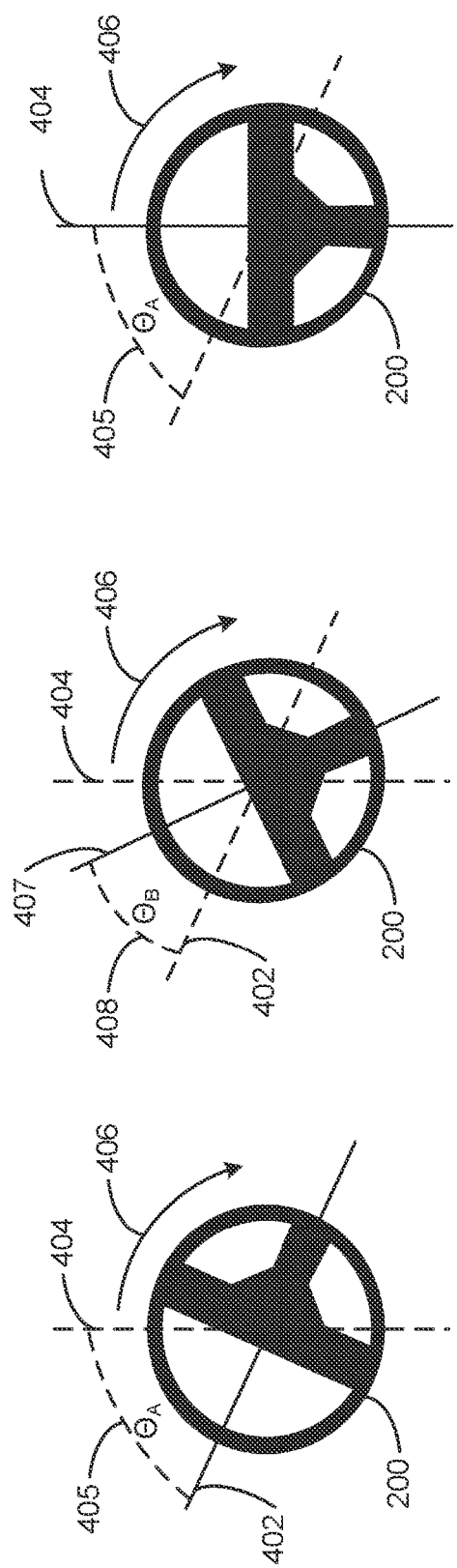
FIGS. 4A-4E are illustrations of various steering wheel positions during an example steering wheel adjustment process executed by the steering controller of FIG. 1.
Figure 8:
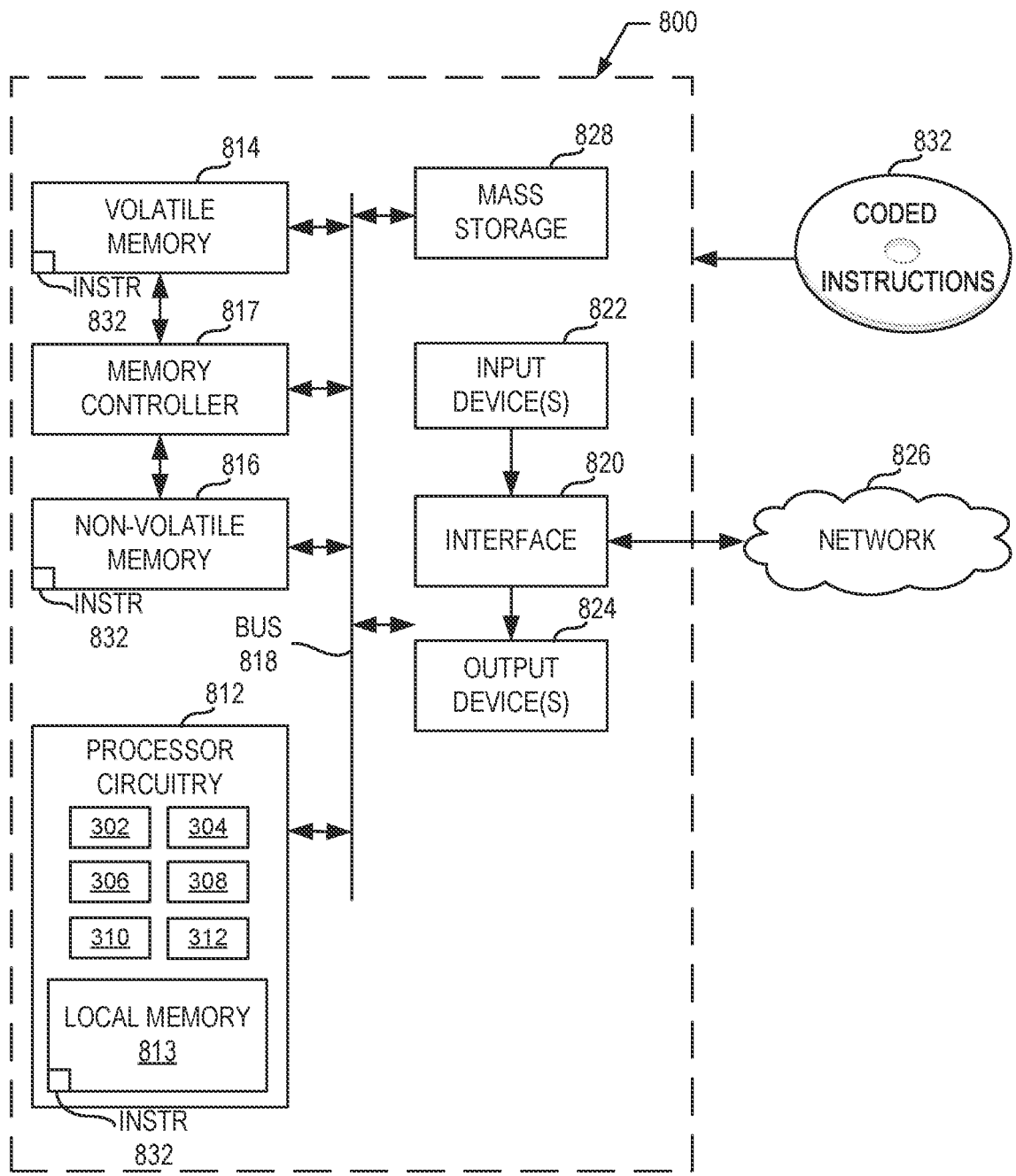
FIG. 8 is a block diagram of an example processing platform including processor circuitry structured to execute the example machine readable instructions of FIG. 7 to implement steering controller of FIGS. 1 and/or 3.

FIG. 8 is a block diagram of an example processor platform 800 structured to execute and/or instantiate the machine readable instructions and/or operations of FIG. 7 to implement the steering controller 104 of FIGS. 1 and 4. The processor platform 800 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 800 of the illustrated example includes processor circuitry 812. The processor circuitry 812 of the illustrated example is hardware. For example, the processor circuitry 812 can be implemented by one or more integrated circuits, logic circuits, FPGAs microprocessors, CPUs, GPUs, DSPs, and/or microcontrollers from any desired family or manufacturer. The processor circuitry 812 may be implemented by one or more semiconductor based (e.g., silicon based) devices. In this example, the processor circuitry 812 implements the request interface circuitry 302, the sensor interface circuitry 304, the current position determiner circuitry 306, the offset angle determiner circuitry 308, the steering assist interface circuitry 310, and the example position comparator circuitry 312.

The processor circuitry 812 of the illustrated example includes a local memory 813 (e.g., a cache, registers, etc.). The processor circuitry 812 of the illustrated example is in communication with a main memory including a volatile memory 814 and a non-volatile memory 816 by a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory 814, 816 of the illustrated example is controlled by a memory controller 817.

The processor platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 822 are connected to the interface circuitry 820. The input device(s) 822 permit(s) a user to enter data and/or commands into the processor circuitry 812. The input device(s) 822 can be implemented by, for example, an audio sensor, a microphone, a camera (still or video), a keyboard, a button, a mouse, a touchscreen, a track-pad, a trackball, an isopoint device, and/or a voice recognition system.

One or more output devices 824 are also connected to the interface circuitry 820 of the illustrated example. The output devices 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 826. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 800 of the illustrated example also includes one or more mass storage devices 828 to store software and/or data. Examples of such mass storage devices 828 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 832, which may be implemented by the machine readable instructions of FIG. 7, may be stored in the mass storage device 828, in the volatile memory 814, in the non-volatile memory 816, and/or on a removable non-transitory computer readable storage medium such as a CD or DVD.

Figure 9:
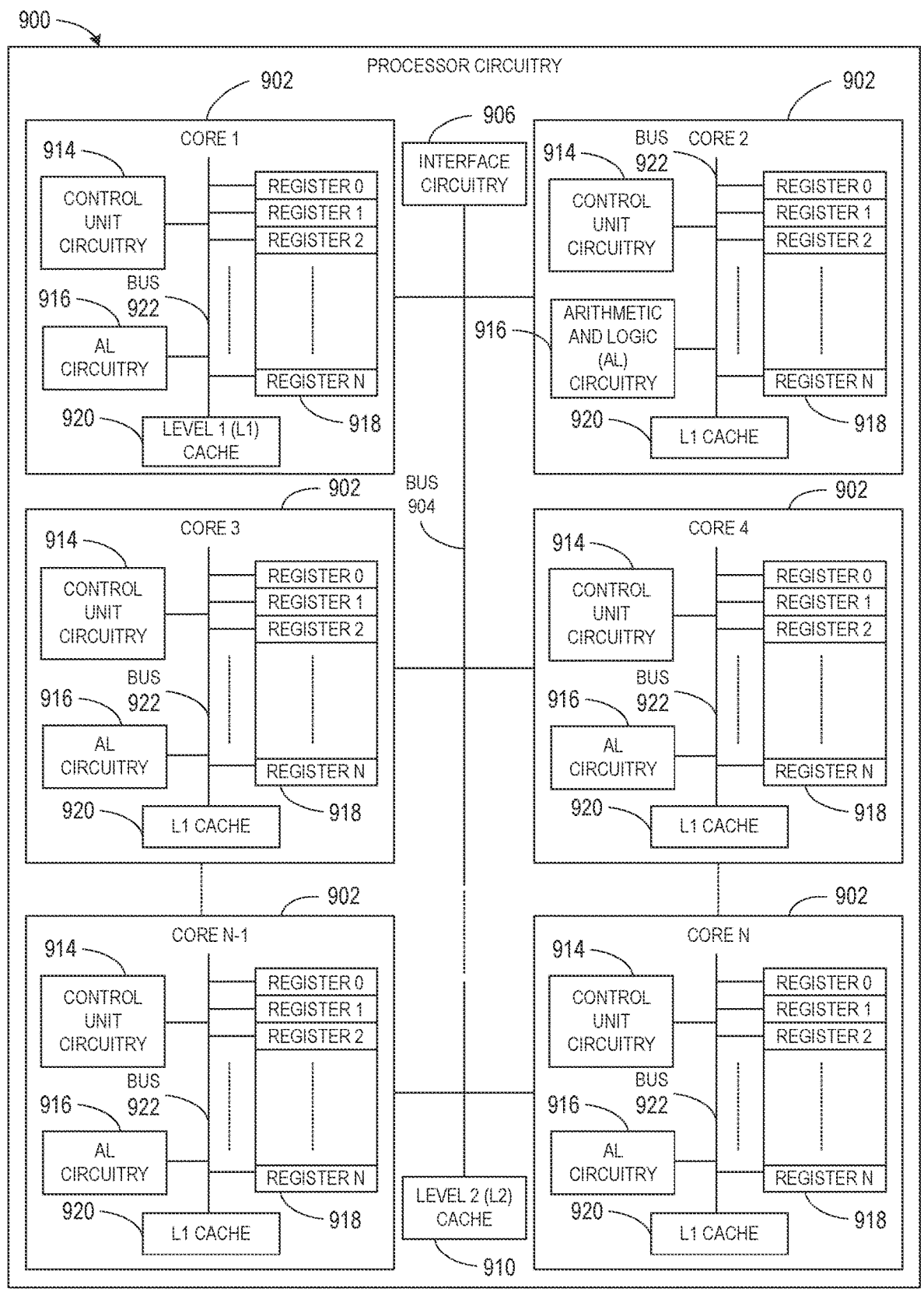
FIG. 9 is a block diagram of an example implementation of the processor circuitry of FIG. 8.

FIG. 9 is a block diagram of an example implementation of the processor circuitry 812 of FIG. 8. In this example, the processor circuitry 812 of FIG. 8 is implemented by a microprocessor 900. For example, the microprocessor 900 may implement multi-core hardware circuitry such as a CPU, a DSP, a GPU, an XPU, etc. Although it may include any number of example cores 902 (e.g., 1 core), the microprocessor 900 of this example is a multi-core semiconductor device including N cores. The cores 902 of the microprocessor 900 may operate independently or may cooperate to execute machine readable instructions. For example, machine code corresponding to a firmware program, an embedded software program, or a software program may be executed by one of the cores 902 or may be executed by multiple ones of the cores 902 at the same or different times. In some examples, the machine code corresponding to the firmware program, the embedded software program, or the software program is split into threads and executed in parallel by two or more of the cores 902. The software program may correspond to a portion or all of the machine readable instructions and/or operations represented by the flowchart of FIG. 7.

The cores 902 may communicate by an example bus 904. In some examples, the bus 904 may implement a communication bus to effectuate communication associated with one(s) of the cores 902. For example, the bus 904 may implement at least one of an Inter-Integrated Circuit (I2C) bus, a Serial Peripheral Interface (SPI) bus, a PCI bus, or a PCIe bus. Additionally or alternatively, the bus 904 may implement any other type of computing or electrical bus. The cores 902 may obtain data, instructions, and/or signals from one or more external devices by example interface circuitry 906. The cores 902 may output data, instructions, and/or signals to the one or more external devices by the interface circuitry 906. Although the cores 902 of this example include example local memory 920 (e.g., Level 1 (L1) cache that may be split into an L1 data cache and an L1 instruction cache), the microprocessor 900 also includes example shared memory 910 that may be shared by the cores (e.g., Level 2 (L2_cache)) for high-speed access to data and/or instructions. Data and/or instructions may be transferred (e.g., shared) by writing to and/or reading from the shared memory 910. The local memory 920 of each of the cores 902 and the shared memory 910 may be part of a hierarchy of storage devices including multiple levels of cache memory and the main memory (e.g., the main memory 814, 816 of FIG. 8). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 902 may be referred to as a CPU, DSP, GPU, etc., or any other type of hardware circuitry. Each core 902 includes control unit circuitry 914, arithmetic and logic (AL) circuitry (sometimes referred to as an ALU) 916, a plurality of registers 918, the L1 cache 920, and an example bus 922. Other structures may be present. For example, each core 902 may include vector unit circuitry, single instruction multiple data (SIMD) unit circuitry, load/store unit (LSU) circuitry, branch/jump unit circuitry, floating-point unit (FPU) circuitry, etc. The control unit circuitry 914 includes semiconductor-based circuits structured to control (e.g., coordinate) data movement within the corresponding core 902. The AL circuitry 916 includes semiconductor-based circuits structured to perform one or more mathematic and/or logic operations on the data within the corresponding core 902. The AL circuitry 916 of some examples performs integer based operations. In other examples, the AL circuitry 916 also performs floating point operations. In yet other examples, the AL circuitry 916 may include first AL circuitry that performs integer based operations and second AL circuitry that performs floating point operations. In some examples, the AL circuitry 916 may be referred to as an Arithmetic Logic Unit (ALU). The registers 918 are semiconductor-based structures to store data and/or instructions such as results of one or more of the operations performed by the AL circuitry 916 of the corresponding core 902. For example, the registers 918 may include vector register(s), SIMD register(s), general purpose register(s), flag register(s), segment register(s), machine specific register(s), instruction pointer register(s), control register(s), debug register(s), memory management register(s), machine check register(s), etc. The registers 918 may be arranged in a bank as shown in FIG. 9. Alternatively, the registers 918 may be organized in any other arrangement, format, or structure including distributed throughout the core 902 to shorten access time. The bus 922 may implement at least one of an I2C bus, a SPI bus, a PCI bus, or a PCIe bus Each core 902 and/or, more generally, the microprocessor 900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 900 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 10:
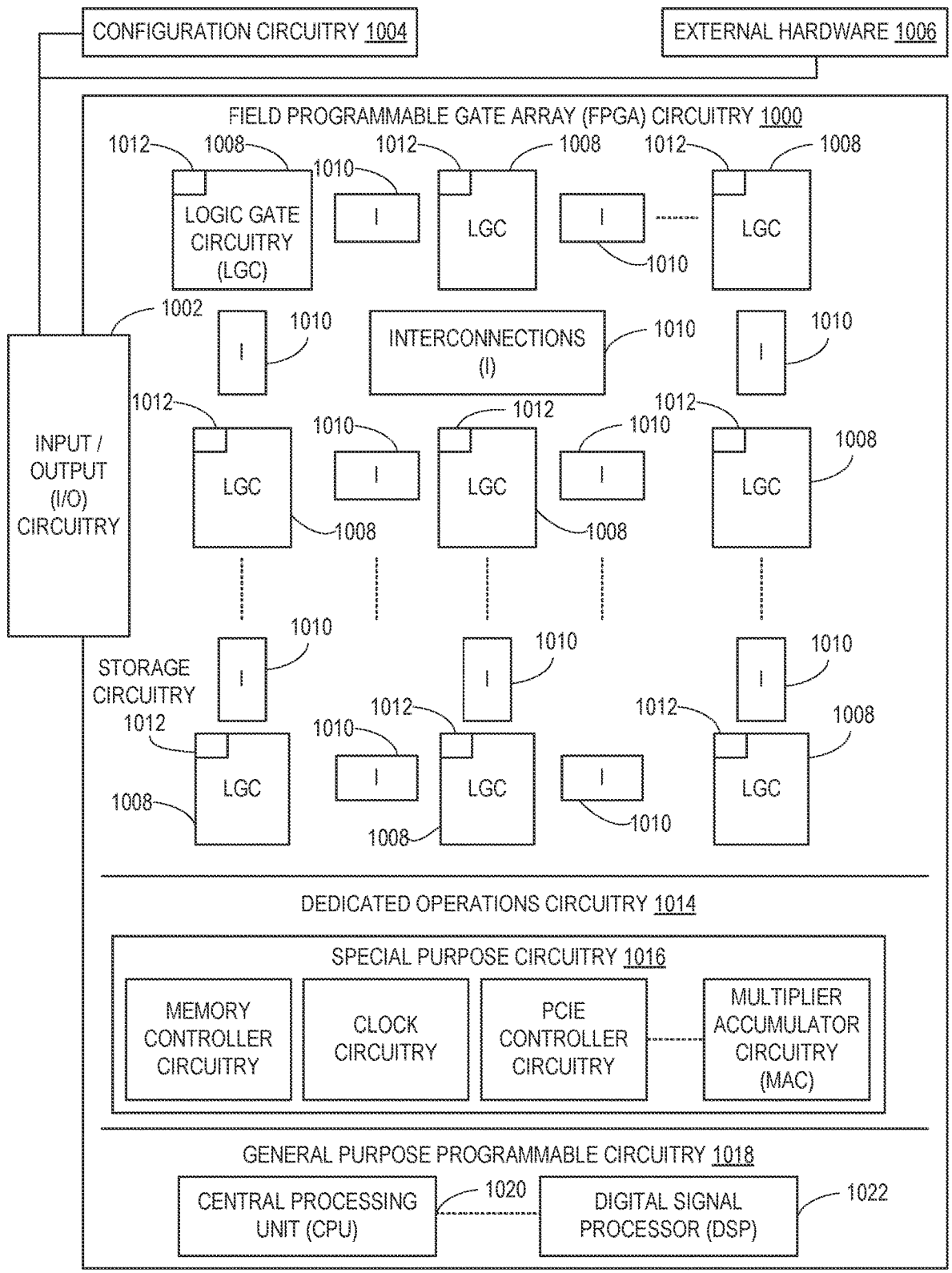
FIG. 10 is a block diagram of another example implementation of the processor circuitry of FIG. 8.

FIG. 10 is a block diagram of another example implementation of the processor circuitry 812 of FIG. 8. In this example, the processor circuitry 812 is implemented by FPGA circuitry 1000. The FPGA circuitry 1000 can be used, for example, to perform operations that could otherwise be performed by the example microprocessor 900 of FIG. 9 executing corresponding machine readable instructions. However, once configured, the FPGA circuitry 1000 instantiates the machine readable instructions in hardware and, thus, can often execute the operations faster than they could be performed by a general purpose microprocessor executing the corresponding software.

More specifically, in contrast to the microprocessor 900 of FIG. 9 described above (which is a general purpose device that may be programmed to execute some or all of the machine readable instructions represented by the flowchart of FIG. 7 but whose interconnections and logic circuitry are fixed once fabricated), the FPGA circuitry 1000 of the example of FIG. 10 includes interconnections and logic circuitry that may be configured and/or interconnected in different ways after fabrication to instantiate, for example, some or all of the machine readable instructions represented by the flowchart of FIG. 7. In particular, the FPGA 1000 may be thought of as an array of logic gates, interconnections, and switches. The switches can be programmed to change how the logic gates are interconnected by the interconnections, effectively forming one or more dedicated logic circuits (unless and until the FPGA circuitry 1000 is reprogrammed). The configured logic circuits enable the logic gates to cooperate in different ways to perform different operations on data received by input circuitry. Those operations may correspond to some or all of the software represented by the flowchart of FIG. 7. As such, the FPGA circuitry 1000 may be structured to effectively instantiate some or all of the machine readable instructions of the flowchart of FIG. 7 as dedicated logic circuits to perform the operations corresponding to those software instructions in a dedicated manner analogous to an ASIC. Therefore, the FPGA circuitry 1000 may perform the operations corresponding to the some or all of the machine readable instructions of FIG. 7 faster than the general purpose microprocessor can execute the same.

In the example of FIG. 10, the FPGA circuitry 1000 is structured to be programmed (and/or reprogrammed one or more times) by an end user by a hardware description language (HDL) such as Verilog. The FPGA circuitry 1000 of FIG. 10, includes example input/output (I/O) circuitry 1002 to obtain and/or output data to/from example configuration circuitry 1004 and/or external hardware (e.g., external hardware circuitry) 1006. For example, the configuration circuitry 1004 may implement interface circuitry that may obtain machine readable instructions to configure the FPGA circuitry 1000, or portion(s) thereof. In some such examples, the configuration circuitry 1004 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1006 may implement the microprocessor 900 of FIG. 9. The FPGA circuitry 1000 also includes an array of example logic gate circuitry 1008, a plurality of example configurable interconnections 1010, and example storage circuitry 1012. The logic gate circuitry 1008 and interconnections 1010 are configurable to instantiate one or more operations that may correspond to at least some of the machine readable instructions of FIG. 7 and/or other desired operations. The logic gate circuitry 1008 shown in FIG. 10 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1008 to enable configuration of the electrical structures and/or the logic gates to form circuits to perform desired operations. The logic gate circuitry 1008 may include other electrical structures such as look-up tables (LUTs), registers (e.g., flip-flops or latches), multiplexers, etc.

The interconnections 1010 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1008 to program desired logic circuits.

The storage circuitry 1012 of the illustrated example is structured to store result(s) of the one or more of the operations performed by corresponding logic gates. The storage circuitry 1012 may be implemented by registers or the like. In the illustrated example, the storage circuitry 1012 is distributed amongst the logic gate circuitry 1008 to facilitate access and increase execution speed.

The example FPGA circuitry 1000 of FIG. 10 also includes example Dedicated Operations Circuitry 1014. In this example, the Dedicated Operations Circuitry 1014 includes special purpose circuitry 1016 that may be invoked to implement commonly used functions to avoid the need to program those functions in the field. Examples of such special purpose circuitry 1016 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1000 may also include example general purpose programmable circuitry 1018 such as an example CPU 1020 and/or an example DSP 1022. Other general purpose programmable circuitry 1018 may additionally or alternatively be present such as a GPU, an XPU, etc., that can be programmed to perform other operations.

Although FIGS. 9 and 10 illustrate two example implementations of the processor circuitry 812 of FIG. 8, many other approaches are contemplated. For example, as mentioned above, modern FPGA circuitry may include an on-board CPU, such as one or more of the example CPU 1020 of FIG. 10. Therefore, the processor circuitry 812 of FIG. 8 may additionally be implemented by combining the example microprocessor 900 of FIG. 9 and the example FPGA circuitry 1000 of FIG. 10. In some such hybrid examples, a first portion of the machine readable instructions represented by the flowchart of FIG. 7 may be executed by one or more of the cores 902 of FIG. 9 and a second portion of the machine readable instructions represented by the flowchart of FIG. 7 may be executed by the FPGA circuitry 1000 of FIG. 10.

In some examples, the processor circuitry 812 of FIG. 8 may be in one or more packages. For example, the processor circuitry 900 of FIG. 9 and/or the FPGA circuitry 1000 of FIG. 10 may be in one or more packages. In some examples, an XPU may be implemented by the processor circuitry 812 of FIG. 8, which may be in one or more packages. For example, the XPU may include a CPU in one package, a DSP in another package, a GPU in yet another package, and an FPGA in still yet another package.

Example methods, apparatus, systems, and articles of manufacture to move a steering wheel rotation are disclosed herein. Further examples and combinations thereof include the following:

Example methods, apparatus, systems, and articles of manufacture to methods and apparatus to move a steering wheel are disclosed herein. Further examples and combinations thereof include the following:

Example 1 includes a vehicle comprising a steering assist system, a steering wheel, and a steering controller to detect a request to move the steering wheel of the vehicle to a first rotational position, the steering wheel having a second rotational position, actuate, via the steering assist system, the steering wheel towards the first rotational position, determine, based on a relationship between a first parameter and a second parameter, a third rotational position, the third rotational position having an angular offset from the first rotational position, the first parameter corresponding to a position of the steering system, the second parameter corresponding to a load on the steering system, and in response to reaching the third rotational position, disengage the steering assist system, the disengagement causing the steering wheel to rotate to the first rotational position.

Example 2 includes the vehicle of example 1, wherein the first parameter includes at least one of a steering wheel angle or a steering rack displacement.

Example 3 includes the vehicle of example 1, wherein the second parameter includes a first load on a tie rod, a torque of a power steering motor, a current of the power steering motor, or a second load on a steering rack.

Example 4 includes the vehicle of example 1, wherein the steering controller determines the third rotational position during the actuation of the steering wheel towards the first rotational position.

Example 5 includes the vehicle of example 4, wherein the steering controller determines an angular displacement during the actuation of the steering wheel towards the first rotational position, wherein the relationship between the first parameter and the second parameter changes from a first relationship to a second relationship, and wherein determination of the third rotational position includes setting the angular offset equal in magnitude to the angular displacement.

Example 6 includes the vehicle of example 1, further including a suspension system, a wheel including a tire, and a steering rack, the angular offset compensating for residual forces associated with at least a first position of the steering rack, a second position of the suspension system, or a third position of the tire.

Example 7 includes the vehicle of example 1, wherein the first rotational position is a centered position and further including, in response to reaching the first rotational position, stowing the steering wheel.

Example 8 includes a method comprising detecting a request to move a steering wheel of a steering system of a vehicle to a first rotational position, the steering wheel having a second rotational position, actuating, via a steering assist system, the steering wheel towards the first rotational position, determining, based on a relationship between a first parameter and a second parameter, a third rotational position, the third rotational position having an angular offset from the first rotational position, the first parameter corresponding to a position of the steering system, the second parameter corresponding to a load on the steering system, and in response to reaching third rotational position, disengaging the steering assist system, the disengagement causing the steering wheel to rotate to the first rotational position.

Example 9 includes the method of example 8, wherein the first parameter includes at least one of a steering wheel angle or a steering rack displacement.

Example 10 includes the method of example 8, wherein the second parameter includes a first load on a tie rod, a torque of a power steering motor, a current of the power steering motor, or a second load on a steering rack.

Example 11 includes the method of example 8, wherein the determination of the third rotational position occurs during the actuation of the steering wheel towards the first rotational position.

Example 12 includes the method of example 11, further including determining an angular displacement during the actuation of the steering wheel towards the first rotational position, wherein the relationship between the first parameter and the second parameter changes from a first relationship to a second relationship, and wherein determination of the third rotational position includes setting the angular offset equal in magnitude to the angular displacement.

Example 13 includes the vehicle of example 1, wherein the angular offset compensates for residual forces associated with at least of a first position of a steering rack, a second position of a suspension system, or a third position of a tire.

Example 14 includes a non-transitory computer readable medium comprising instructions which, when executed, cause a processor to at least detect a request to move a steering wheel of a steering system of a vehicle to a first rotational position, the steering wheel having a second rotational position, actuate, via a steering assist system, the steering wheel towards the first rotational position, determine, based on a relationship between a first parameter and a second parameter, a third rotational position, the third rotational position having an angular offset from the first rotational position, the first parameter corresponding to a position of the steering system, the second parameter corresponding to a load on the steering system, and in response to reaching third rotational position, disengage the steering assist system, the disengagement causing the steering wheel to rotate to the first rotational position.

Example 15 includes the non-transitory computer readable medium of example 14, wherein the first parameter includes at least one of a steering wheel angle or a steering rack displacement.

Example 16 includes the non-transitory computer readable medium of example 14, wherein the second parameter includes a first load on a tie rod, a torque of a power steering motor, a current of the power steering motor, or a second load on a steering rack.

Example 17 includes the non-transitory computer readable medium of example 14, wherein the instructions, when executed, cause the processor to determine the third rotational position during the actuation of the steering wheel towards the first rotational position.

Example 18 includes the non-transitory computer readable medium of example 17, wherein the instructions, when executed, cause the processor to determine an angular displacement, during the actuation of the steering wheel towards the first rotational position, wherein the relationship between the first parameter and the second parameter changes from a first relationship to a second relationship, and wherein determination of the third rotational position includes setting the angular offset equal in magnitude to the angular displacement.

Example 19 includes the non-transitory computer readable medium of example 14, wherein the angular offset compensates for residual forces associated with at least of a first position of a steering rack, a second position of a suspension system, or a third position of a tire.

Example 20 includes the non-transitory computer readable medium of example 14, wherein the first rotational position is a centered position and further including, in response to reaching the first rotational position, stowing the steering wheel.

The following claims are hereby incorporated into this Detailed Description by this reference, with each claim standing on its own as a separate embodiment of the present disclosure.

What is claimed is:

1. A vehicle comprising:
   a steering assist system;
   a steering system including a steering wheel; and
   a steering controller to:
      detect a request to move the steering wheel of the vehicle to a first rotational position, the steering wheel having a second rotational position;
      actuate, via the steering assist system, the steering wheel towards the first rotational position;
      determine, based on a relationship between a first parameter and a second parameter, a third rotational position, the third rotational position having an angular offset from the first rotational position, the first parameter corresponding to a position of the steering system, the second parameter corresponding to a load on the steering system; and
      in response to reaching the third rotational position, disengage the steering assist system, the disengagement causing the steering wheel to rotate to the first rotational position.

2. The vehicle of claim 1, wherein the first parameter includes at least one of a steering wheel angle or a steering rack displacement.

3. The vehicle of claim 1, wherein the second parameter includes a first load on a tie rod, a torque of a power steering motor, a current of the power steering motor, or a second load on a steering rack.

4. The vehicle of claim 1, wherein the steering controller determines the third rotational position during the actuation of the steering wheel towards the first rotational position.

5. The vehicle of claim 4, wherein the steering controller:
   determines an angular displacement during the actuation of the steering wheel towards the first rotational position, wherein the relationship between the first parameter and the second parameter changes from a first relationship to a second relationship; and
   wherein determination of the third rotational position includes setting the angular offset equal in magnitude to the angular displacement.

6. The vehicle of claim 1, further including:
   a suspension system;
   a wheel including a tire; and
   a steering rack, the angular offset compensating for residual forces associated with at least a first position of the steering rack, a second position of the suspension system, or a third position of the tire.

7. The vehicle of claim 1, wherein the first rotational position is a centered position and further including, in response to reaching the first rotational position, stowing the steering wheel.

8. The vehicle of claim 1, wherein the angular offset compensates for residual forces associated with at least of a first position of a steering rack, a second position of a suspension system, or a third position of a tire.

9. A method comprising:
   detecting a request to move a steering wheel of a steering system of a vehicle to a first rotational position, the steering wheel having a second rotational position;
   actuating, via a steering assist system, the steering wheel towards the first rotational position;
   determining, based on a relationship between a first parameter and a second parameter, a third rotational position, the third rotational position having an angular offset from the first rotational position, the first parameter corresponding to a position of the steering system, the second parameter corresponding to a load on the steering system; and
   in response to reaching third rotational position, disengaging the steering assist system, the disengagement causing the steering wheel to rotate to the first rotational position.

10. The method of claim 9, wherein the first parameter includes at least one of a steering wheel angle or a steering rack displacement.

11. The method of claim 9, wherein the second parameter includes a first load on a tie rod, a torque of a power steering motor, a current of the power steering motor, or a second load on a steering rack.

12. The method of claim 9, wherein the determination of the third rotational position occurs during the actuation of the steering wheel towards the first rotational position.

13. The method of claim 12, further including:
   determining an angular displacement during the actuation of the steering wheel towards the first rotational position, wherein the relationship between the first parameter and the second parameter changes from a first relationship to a second relationship; and
   wherein determination of the third rotational position includes setting the angular offset equal in magnitude to the angular displacement.

14. A non-transitory computer readable medium comprising instructions which, when executed, cause a processor to at least:
   detect a request to move a steering wheel of a steering system of a vehicle to a first rotational position, the steering wheel having a second rotational position;

actuate, via a steering assist system, the steering wheel towards the first rotational position;

determine, based on a relationship between a first parameter and a second parameter, a third rotational position, the third rotational position having an angular offset from the first rotational position, the first parameter corresponding to a position of the steering system, the second parameter corresponding to a load on the steering system; and in response to reaching third rotational position, disengage the steering assist system, the disengagement causing the steering wheel to rotate to the first rotational position.

15. The non-transitory computer readable medium of claim 14, wherein the first parameter includes at least one of a steering wheel angle or a steering rack displacement.

16. The non-transitory computer readable medium of claim 14, wherein the second parameter includes a first load on a tie rod, a torque of a power steering motor, a current of the power steering motor, or a second load on a steering rack.

17. The non-transitory computer readable medium of claim 14, wherein the instructions, when executed, cause the processor to determine the third rotational position during the actuation of the steering wheel towards the first rotational position.

18. The non-transitory computer readable medium of claim 17, wherein the instructions, when executed, cause the processor to:

determine an angular displacement, during the actuation of the steering wheel towards the first rotational position, wherein the relationship between the first parameter and the second parameter changes from a first relationship to a second relationship; and wherein determination of the third rotational position includes setting the angular offset equal in magnitude to the angular displacement.

19. The non-transitory computer readable medium of claim 14, wherein the angular offset compensates for residual forces associated with at least of a first position of a steering rack, a second position of a suspension system, or a third position of a tire.

20. The non-transitory computer readable medium of claim 14, wherein the first rotational position is a centered position and further including, in response to reaching the first rotational position, stowing the steering wheel.

* * * * *